(12) United States Patent
Yasuda et al.

(10) Patent No.: US 8,529,047 B2
(45) Date of Patent: Sep. 10, 2013

(54) INK COMPOSITION, INK SET AND IMAGE FORMING METHOD

(75) Inventors: Koji Yasuda, Kanagawa (JP); Takahiro Kato, Kanagawa (JP); Yasufumi Ooishi, Kanagawa (JP); Hirotaka Kitagawa, Kanagawa (JP); Toshihiro Kamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 322 days.

(21) Appl. No.: 13/033,623

(22) Filed: Feb. 24, 2011

(65) Prior Publication Data

US 2011/0205291 A1    Aug. 25, 2011

(30) Foreign Application Priority Data

Feb. 25, 2010  (JP) ................. 2010-040503
Feb. 21, 2011  (JP) ................. 2011-035090

(51) Int. Cl.
*G01D 11/00*  (2006.01)

(52) U.S. Cl.
USPC ........................... 347/100; 347/96

(58) Field of Classification Search
USPC ............ 347/5, 15, 21, 40, 43, 95–100
See application file for complete search history.

(56) References Cited

U.S. PATENT DOCUMENTS 7,285,310 B2 * 10/2007 Kanke et al. ............... 427/466
2005/0288384 A1   12/2005 Kanke et al.

FOREIGN PATENT DOCUMENTS

| EP | 0337705 A | 10/1989 |
| EP | 1935659 A | 6/2008 |
| JP | 2007-314610 A | 12/2007 |

OTHER PUBLICATIONS

Stefan Baudis et al., "(Meth)acrylate-Based Photoelastomers as Tailored Biomaterials for Artificial Vascular Grafts", Journal of Polymer Science: Part A: Polymer Chemistry, 2009, pp. 2664-2676, vol. 47.

* cited by examiner

*Primary Examiner* — Thinh Nguyen
(74) *Attorney, Agent, or Firm* — SOLARIS Intellectual Property Group, PLLC

(57) ABSTRACT

An aqueous ink composition including: a water-soluble polymerizable compound containing two or more polymerizable functional groups each selected from the group consisting of a (meth)acrylamide group, a maleimide group, a vinyl sulfone group, and an N-vinyl amide group, wherein a ratio of a molecular weight of the compound relative to a number of the polymerizable functional groups contained in a single molecule of the compound is 175 or less; a polymerization initiator; and water.

16 Claims, No Drawings

INK COMPOSITION, INK SET AND IMAGE FORMING METHOD

CROSS-REFERENCE TO RELATED APPLICATION

This application claims priority under 35 USC 119 from Japanese Patent Application No. 2010-040503 filed on Feb. 25, 2010 and Japanese Patent Application No. 2011-035090 filed on Feb. 21, 2011, the disclosures of which are incorporated by reference herein.

BACKGROUND OF THE INVENTION

1. Field of the Invention

The present invention relates to an ink set suitable for recording an image by jetting an ink by an ink-jet method, and an ink-jet recording method using the same.

2. Description of the Related Art

In recent years, paints and inks have been increasingly shifted to aqueous types in response to the increased need for resource conservation, environmental protection, improvement in working safety, and the like. As an aqueous ink for forming a printed image having improved fixability, an ultraviolet curable aqueous ink has been known for a long time, for example.

As a water-soluble polymerizable compound applicable to such an ultraviolet curable aqueous ink, a polymerizable compound containing a long-chain water-soluble group has been known (e.g., see Japanese Patent Application Laid-Open (JP-A) No. 2007-314610).

As a crosslinkable monomer for forming a biocompatible material, a certain kind of acrylamide compound has been disclosed (e.g., see Journal of Polymer Science: Part A: Polymer Chemistry, Vol. 47, 2664-2676 (2009)).

However, the polymerizable compound disclosed in JP-A No. 2007-314610 has caused a reduction in curing sensitivity resulting from an increase in the molecular weight and a reduction in blocking resistance of an obtained image in some cases.

SUMMARY OF THE INVENTION

According to an aspect of the invention, there is provided an aqueous ink composition including: a water-soluble polymerizable compound containing two or more polymerizable functional groups each selected from the group consisting of a (meth)acrylamide group, a maleimide group, a vinyl sulfone group, and an N-vinyl amide group, wherein a ratio of a molecular weight of the compound relative to a number of the polymerizable functional groups contained in a single molecule of the compound is 175 or less; a polymerization initiator; and water.

DETAILED DESCRIPTION OF THE INVENTION

<Aqueous Ink Composition>

An aqueous ink composition of the present invention (hereinafter also simply referred to as an "ink composition") contains at least one water-soluble polymerizable compound containing two or more polymerizable functional groups each selected from the group consisting of a (meth)acrylamide group, a maleimide group, a vinyl sulfone group, and an N-vinyl amide group, wherein the ratio of the molecular weight of the compound relative to the number of the polymerizable functional groups contained in a single molecule of the compound is 175 or less, at least one polymerization initiator, and water, and optionally further contains a coloring material (preferably a pigment), a water-soluble organic solvent, and other additives.

Since a specific polymerizable compound and a polymerization initiator are contained, when the ink composition is applied onto a recording medium and then the ink composition is irradiated with an active energy ray, for example, the ink composition is cured with excellent curing sensitivity, and further the image quality and the blocking resistance of the image obtained by curing are excellent.

The ink composition of the invention may be used not only for the formation of a monochrome image but for the formation of a multicolored image (e.g., a full color image), and an image can be formed by the selection of one or two or more of the ink compositions having desired colors. When a multicolored image is formed, the ink compositions can be used as a magenta color tone ink, a cyan color tone ink, and a yellow color tone ink, for example. In order to adjust the color tone, the ink composition may also be used as a black color tone ink.

The ink composition of the invention can also be used as an ink composition of a color tone of red (R), green (G), blue (B), or white (W), other than the color tones of yellow (Y), magenta (M), and cyan (C), or as a so-called specific color ink composition in a printing field.

The ink compositions of the respective color tones described above can be prepared by changing the hue of coloring agents (e.g., pigments) as desired.

(Polymerizable Compound)

An aqueous ink composition of the invention contains a water-soluble polymerizable compound (hereinafter also referred to as a "specific polymerizable compound") containing two or more polymerizable functional groups each selected from the group consisting of a (meth)acrylamide group, a maleimide group, a vinyl sulfone group, and an N-vinyl amide group, wherein the ratio of the molecular weight of the compound relative to the number of the polymerizable functional groups contained in a single molecule of the compound is 175 or less.

The "water solubility" used herein means that 2% by mass or more of the specific polymerizable compound dissolves in 25° C. distilled water. The solubility is preferably 3.5% by mass or more, more preferably 5% by mass or more, even more preferably 10% by mass or more, and still more preferably 20% by mass or more. It is particularly preferable for the specific polymerizable compound to be uniformly mixed with water at an arbitrary ratio.

The (meth)acryl amide group refers to at least one of an acrylamide group and a methacrylamide group.

The polymerizable compound in the invention is a water-soluble polymerizable compound having two or more polymerizable functional groups each selected from specific polymerizable functional groups, wherein the ratio of the molecular weight of the compound relative to the number of the contained polymerizable functional groups is 175 or less. Since the density of the polymerizable functional groups contained in molecules is high in the specific polymerizable compound, the curing sensitivity is excellent and the blocking resistance of the image formed by curing is excellent. It can be considered that this is because a cured film having a high crosslinking density is formed by curing, and a cured film (image) excellent in film physical properties is constituted.

In the specific polymerizable compound, the ratio of the molecular weight of the polymerizable compound relative to the number of the polymerizable functional groups contained in a singe molecule of the compound is 175 or less. More specifically, the value (Molecular weight of the polymerizable compound/Number of the contained polymerizable functional groups, which is sometimes also referred to as an "A value") obtained by dividing the molecular weight of the polymerizable compound by the number of the polymerizable functional groups contained per molecule is 175 or less, and is preferably 171 or less and more preferably 165 or less from the viewpoint of curing sensitivity and blocking resistance. The A value is preferably 84 or more from the viewpoint in terms of the structure.

The A value is preferably from 84 to 175, more preferably from 84 to 171 and still more preferably from 84 to 165.

In the specific polymerizable compound, the number of the polymerizable functional groups contained in a single molecule of the compound is 2 or more, and is preferably from 2 to 6 and more preferably from 2 to 3 from the viewpoint of the curing sensitivity and the blocking resistance.

The specific polymerizable compound has two or more polymerizable functional groups each selected from the group consisting of a (meth)acrylamide group, a maleimide group, a vinyl sulfone group, and an N-vinylamide group. The two or more polymerizable functional groups in the specific polymerizable compound may be the same polymerizable functional groups or mutually different polymerizable functional groups.

Particularly in the invention, the specific polymerizable compound preferably has two or more polymerizable functional groups each selected from the group consisting of a (meth)acrylamide group, a maleimide group, and a vinyl sulfone group, more preferably has at least one (meth)acrylamide group, and still more preferably has two or more (meth)acrylamide groups, from the viewpoint of curing sensitivity and blocking resistance.

Furthermore, it is also preferable that, in the specific polymerizable compound, two or more of the contained polymerizable functional groups are the same. More specifically, the specific polymerizable compound is preferably a polymerizable compound having a functionality of 2 or higher selected from the group consisting of a (meth)acrylamide compound, a maleimide compound, a vinyl sulfone compound, and an N-vinyl amide compound, more preferably a polymerizable compound having a functionality of 2 or higher selected from the group consisting of a (meth)acrylamide compound, a maleimide compound, and a vinyl sulfone compound, and still more preferably a (meth)acrylamide compound.

The specific polymerizable compound preferably further has at least one hydrophilic group in addition to the polymerizable functional groups. The hydrophilic group may be any of a nonionic group, an anionic group, and a cationic group or may be betaine.

Specific examples of the hydrophilic group include an oxyalkylene group and an oligomer thereof, a hydroxyl group, an amide group, a sugar alcohol residue, a urea group, an imino group, an amino group, a carboxyl group, a sulfonic acid group, a phosphoric acid group, a thiol group, and a quaternary ammonium group.

In the invention, from the viewpoint of curing sensitivity and blocking resistance, the hydrophilic group is preferably selected from an oxyalkylene group and an oligomer thereof, a hydroxyl group, an amide group, a sugar alcohol residue, a urea group, an imino group, an amino group, a carboxyl group, a sulfonic acid group, a phosphoric acid group, and a thiol group, more preferably at least one selected from an oxyalkylene group and an oligomer thereof and a hydroxyl group, and still more preferably at least one selected from an oxyethylene group, an oxypropylene group and oligomers thereof (preferably n=1 to 2), and a hydroxyl group.

When the specific polymerizable compound contains the hydrophilic group in addition to the two or more polymerizable functional groups, the linking manner of the polymerizable functional groups and the hydrophilic group is not particularly limited and, from the viewpoint of curing sensitivity and blocking resistance, a linking manner in which the two or more polymerizable functional groups are linked via a divalent or higher valent hydrophilic group is preferable, and a linking manner in which the two or more polymerizable functional groups are linked via a divalent or higher valent hydrophilic group containing at least one selected from an oxyalkylene group and an oligomer thereof and a hydroxyl group is more preferable.

It is preferable that the specific polymerizable compound does not contain a partial structure represented by the following formula (IVa) or (IVb). Due to this feature, the stability of the aqueous ink composition is further improved. It is thought that since the partial structure represented by formula (IVa) or (IVb) is likely to be hydrolyzed, when the specific polymerizable compound does not contain such a partial structure, the stability of the aqueous ink composition is further improved.

In particular, when a nitrogen atom in the partial structure represented by formula (IVa) or (IVb) corresponds to a nitrogen atom in a (meth)acrylamide group, a volatile (meth)acrylamide may be generated by hydrolysis of the partial structure represented by formula (IVa) or (IVb), but the generation of the (meth)acrylamide is suppressed by not containing such a partial structure.

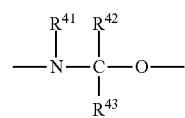

(IVa)

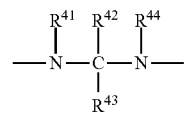

(IVb)

In formulae (IVa) and (IVb), $R^{41}$ to $R^{44}$ each independently represent a hydrogen atom or an alkyl group having 1 to 4 carbon atoms.

In the invention, from the viewpoint of curing sensitivity and blocking resistance, the specific polymerizable compound preferably has two or more polymerizable functional groups each selected from the group consisting of a (meth)acrylamide group, a maleimide group, a vinyl sulfone group, and an N-vinyl amide group and has an A value of from 84 to 175, more preferably has two or more polymerizable functional groups each selected from the group consisting of a (meth)acrylamide group, a maleimide group, a vinyl sulfone group, and an N-vinyl amide group and has an A value of from 84 to 171, still more preferably has two or more polymerizable functional groups each selected from the group consisting of a (meth)acrylamide group, a maleimide group, a vinyl sulfone group, and an N-vinyl amide group and has an A value of from 84 to 165, and particularly preferably is a compound having at least two or more (meth)acrylamide groups and having an A value of from 84 to 165.

The specific polymerizable compound preferably has two or more polymerizable functional groups each selected from the group consisting of a (meth)acrylamide group, a maleimide group, a vinyl sulfone group, and an N-vinyl amide group, and a nonionic hydrophilic group, and has an A value of from 84 to 175, more preferably has two or more polymerizable functional groups each selected from the group consisting of a (meth)acrylamide group, a maleimide group, a vinyl sulfone group, and an N-vinyl amide group, and at least one nonionic hydrophilic group selected from an oxyalkylene group and an oligomer thereof and a hydroxyl group, and has an A value of from 84 to 171, still more preferably has two or more polymerizable functional groups each selected from the group consisting of a (meth)acrylamide group, a maleimide group, a vinyl sulfone group, and an N-vinyl amide group, and at least one nonionic hydrophilic group selected from an oxyalkylene group and an oligomer thereof and a hydroxyl group, and has an A value of from 84 to 165, and particularly preferably has two or more (meth)acrylamide groups and at least one nonionic hydrophilic group selected from an oxyalkylene group and an oligomer thereof and a hydroxyl group and has an A value of from 84 to 165.

The specific polymerizable compound is preferably a (meth)acrylamide compound represented by the following formula (V) from the viewpoint of curing sensitivity, blocking resistance, and ink stability.

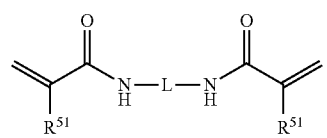
(V)

In formula (V), $R^{51}$ represents a hydrogen atom or a methyl group; and L represents a bivalent linking group consisting of at least one selected from the group consisting of an ethylene group, a 1,2-propylene group, a 1,3-propylene group, an oxygen atom, and a (meth)acryloylimino group.

Two $R^{51}$s in formula (V) may be the same or different from each other.

The bivalent linking group represented by L preferably contains at least one oxyalkylene group, and more preferably contains 1 to 3 oxyalkylene groups from the viewpoint of curing sensitivity.

Specific examples of the bivalent linking group represented by L are shown below, but the invention is not limited by these examples. In the following examples, * represents a position bonded to a (meth)acrylamide group.

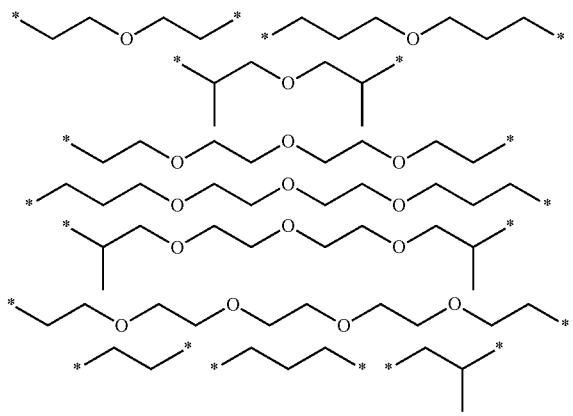

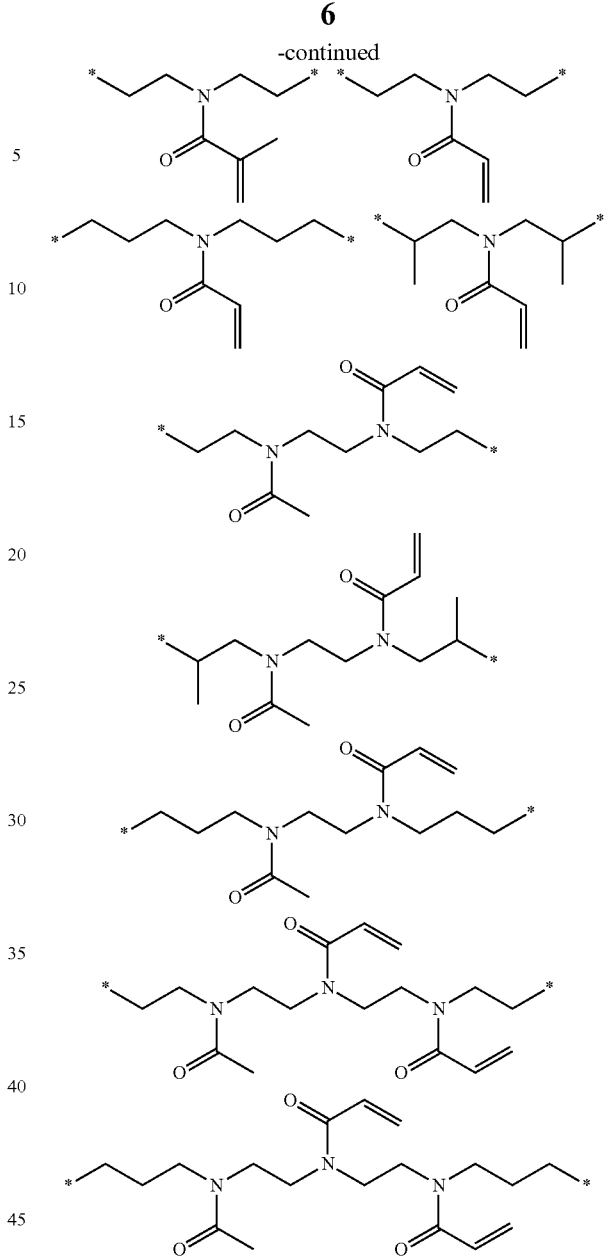

Further, the specific polymerizable compound is preferably a (meth)acrylamide compound represented by any one of the following formulae (I) to (III) from the viewpoint of curing sensitivity, blocking resistance, and ink stability.

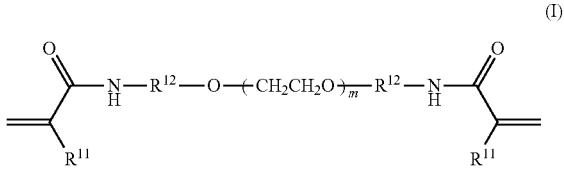
(I)

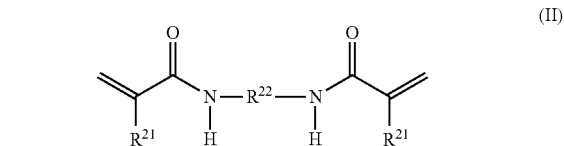
(II)

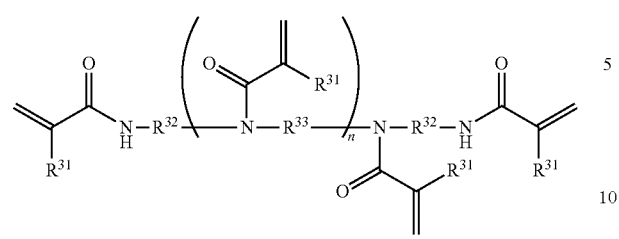

(III)

In formulae (I) to (III), $R^{11}$, $R^{21}$ and $R^{31}$ each independently represent a hydrogen atom or a methyl group; $R^{12}$ and $R^{22}$ each independently represent an ethylene group, a 1,2-propylene group or a 1,3-propylene group; $R^{32}$ and $R^{33}$ each independently represent an ethylene group or a 1,3-propylene group; and m and n each independently represent an integer of from 0 to 2.

$R^{11}$, $R^{21}$ and $R^{31}$ in formulae (I) to (III) may be the same or different from each other.

Hereinafter, specific examples of the specific polymerizable compound in the invention are shown below but the invention is not limited thereto.

Polymerizable compound 1

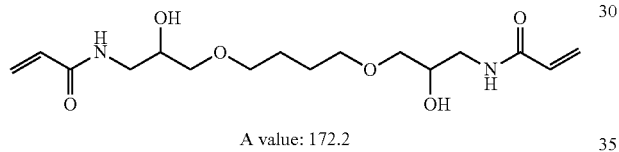

A value: 172.2

Polymerizable compound 2

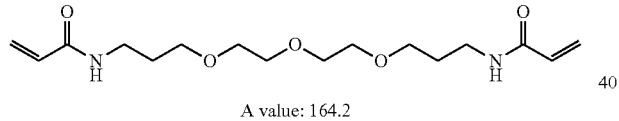

A value: 164.2

Polymerizable compound 3

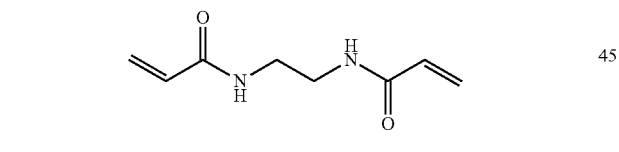

A value: 84.1

Polymerizable compound 4

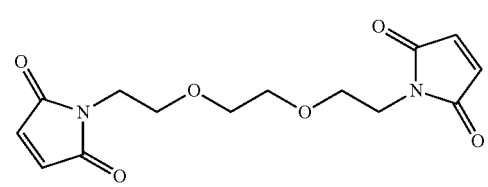

A value: 154.1

Polymerizable compound 5

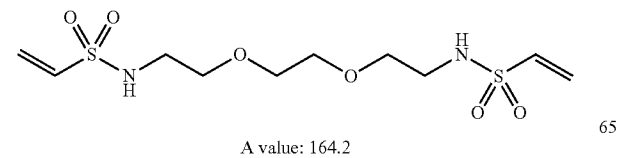

A value: 164.2

Polymerizable compound 6

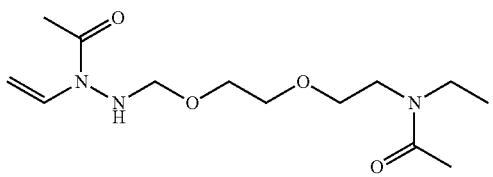

A value: 142.2

Polymerizable compound 7

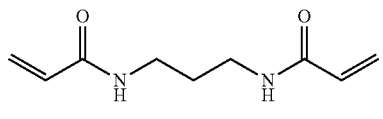

A value: 91.1

Polymerizable compound 8

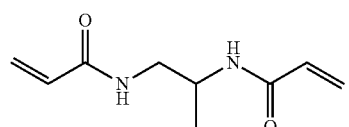

A value: 91.1

Polymerizable compound 9

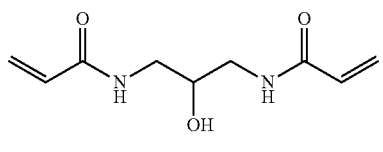

A value: 99.1

Polymerizable compound 10

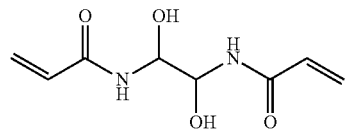

A value 100.1

Polymerizable compound 11

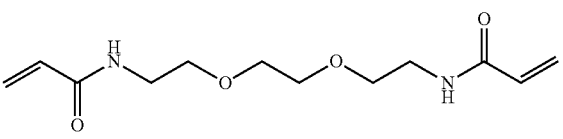

A value 128.2

Polymerizable compound 12

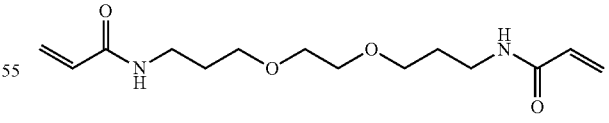

A value 142.2

Polymerizable compound 13

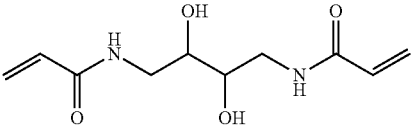

A value 114.1

Polymerizable compound 14

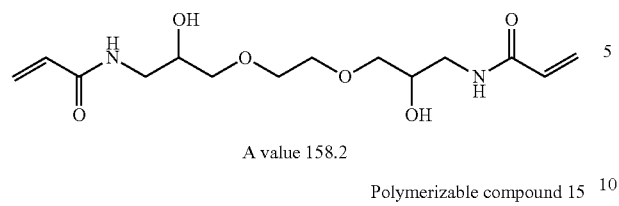

A value 158.2

Polymerizable compound 15

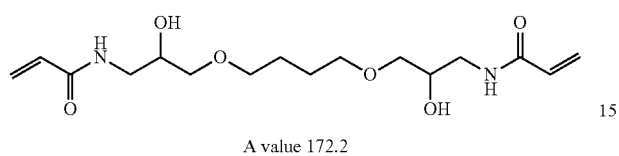

A value 172.2

Polymerizable compound 16

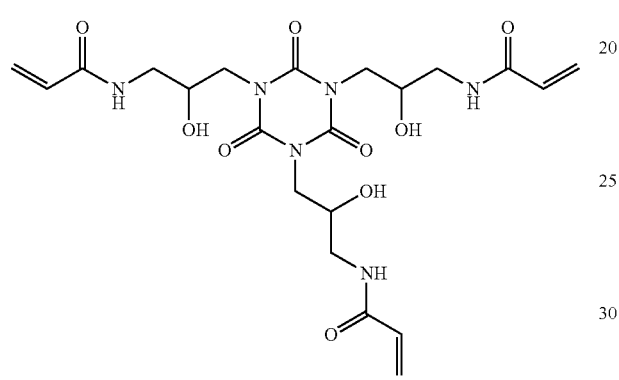

A value: 170.2

Polymerizable compound 17

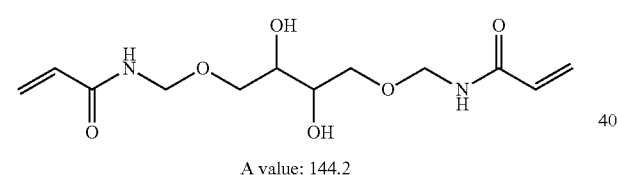

A value: 144.2

Polymerizable compound 18

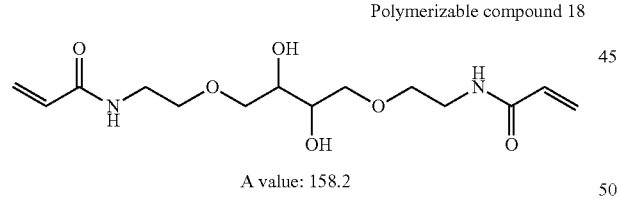

A value: 158.2

Polymerizable compound 19

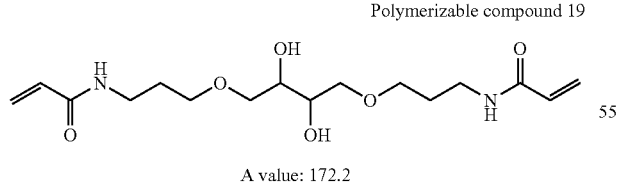

A value: 172.2

Polymerizable compound 20

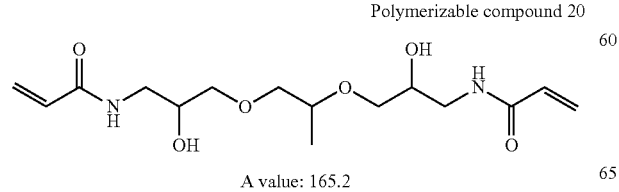

A value: 165.2

Polymerizable compound 21

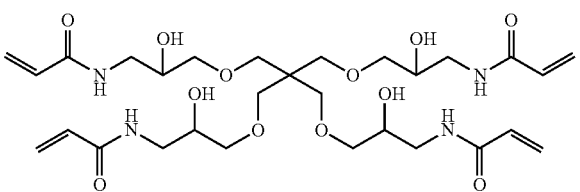

A value: 161.2

Polymerizable compound 22

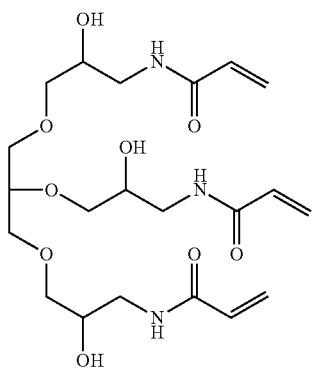

A value: 157.8

Polymerizable compound 23

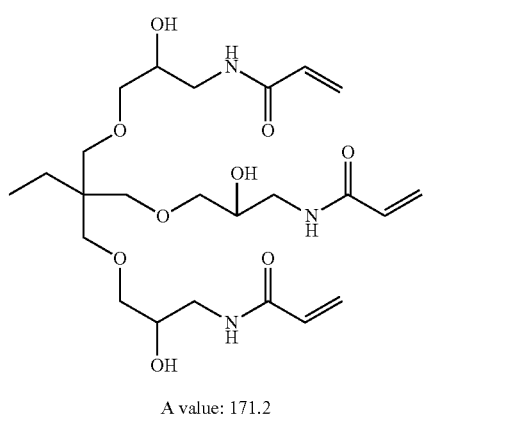

A value: 171.2

Polymerizable compound 24

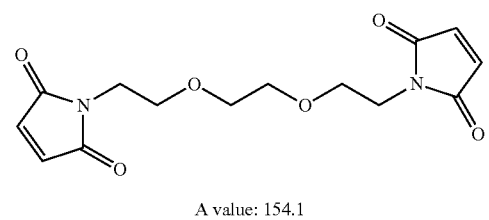

A value: 154.1

Polymerizable compound 25

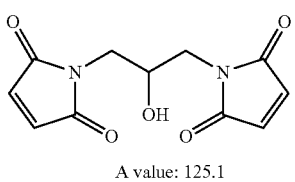

A value: 125.1

Polymerizable compound 26

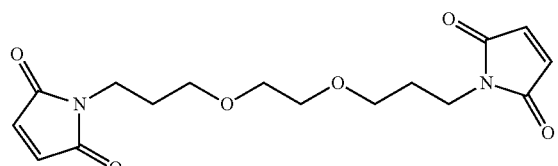

A value: 168.2

Polymerizable compound 27

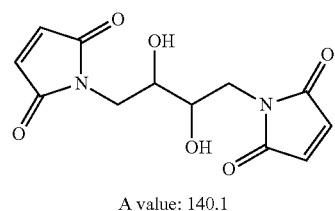

A value: 140.1

Polymerizable compound 28

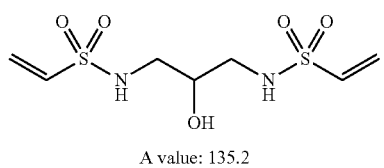

A value: 135.2

Polymerizable compound 29

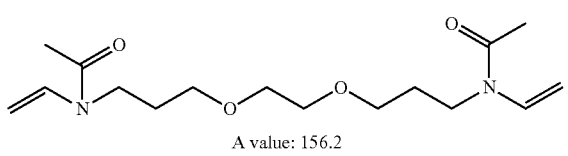

A value: 156.2

Polymerizable compound 30

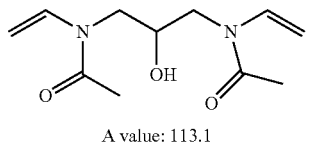

A value: 113.1

Polymerizable compound 31

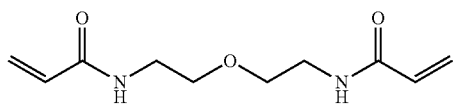

A value: 106.1

Polymerizable compound 32

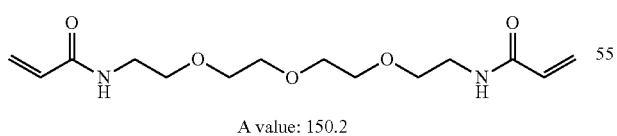

A value: 150.2

Polymerizable compound 33

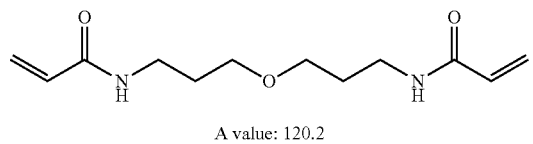

A value: 120.2

Polymerizable compound 34

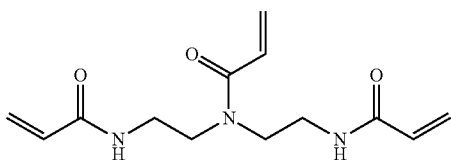

A value: 88.4

Polymerizable compound 35

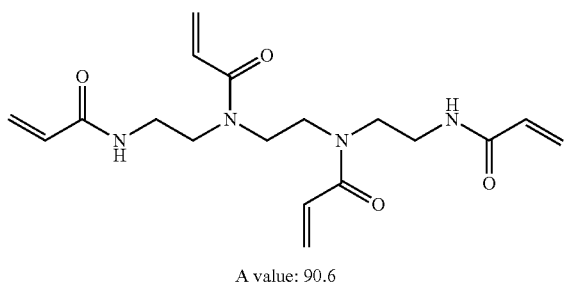

A value: 90.6

Polymerizable compound 36

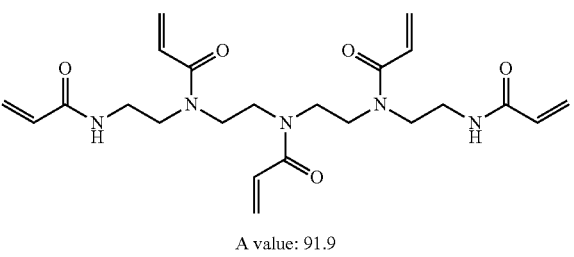

A value: 91.9

Polymerizable compound 37

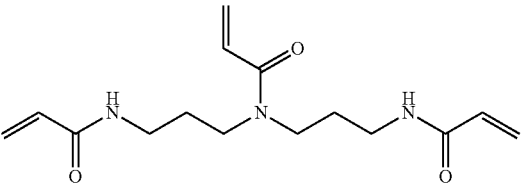

A value: 97.8

Polymerizable compound 38

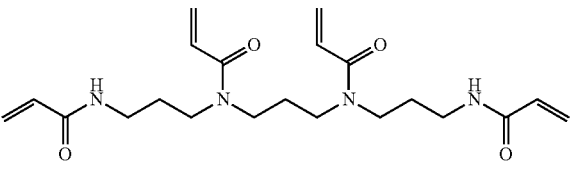

A value: 101.1

Polymerizable compound 39

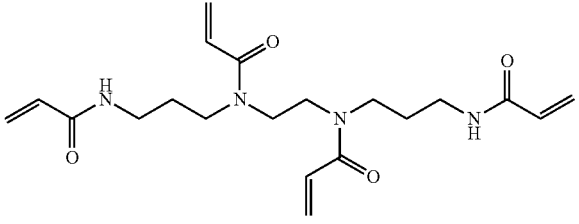

A value: 97.6

Polymerizable compound 40

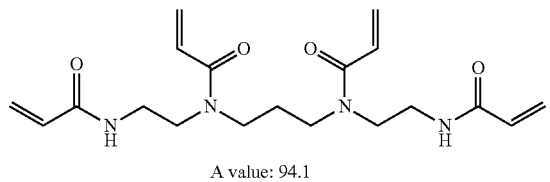

A value: 94.1

The content of the specific polymerizable compound in the ink composition of the invention is preferably in the range of 1 to 50% by mass, more preferably in the range of 1 to 40% by mass, and still more preferably in the range of 1 to 30% by mass in terms of the solid content.

The ink composition of the invention preferably contains the specific polymerizable compound having two or more polymerizable functional groups each selected from the group consisting of a (meth)acrylamide group, a maleimide group, a vinyl sulfone group, and an N-vinyl amide group, and a nonionic hydrophilic group, and having an A value of from 84 to 175, in the proportion ranging from 1 to 50% by mass in terms of the solid content, more preferably contains the specific polymerizable compound having two or more polymerizable functional groups each selected from the group consisting of a (meth)acrylamide group, a maleimide group, a vinyl sulfone group, and an N-vinyl amide group, and at least one nonionic hydrophilic group selected from an oxyalkylene group and an oligomer thereof and a hydroxyl group, and having an A value of from 84 to 165, in the proportion ranging from 1 to 40% by mass in terms of the solid content, still more preferably contains the specific polymerizable compound having two or more (meth)acrylamide groups and at least one nonionic hydrophilic group selected from an oxyalkylene group and an oligomer thereof and a hydroxyl group and having an A value of from 84 to 171 in the proportion ranging from 1 to 30% by mass in terms of the solid content, and particularly preferably contains the specific polymerizable compound having two or more (meth)acrylamide groups and at least one nonionic hydrophilic group selected from an oxyalkylene group and an oligomer thereof and a hydroxyl group and having an A value of from 84 to 165 in the proportion ranging from 1 to 30% by mass in terms of the solid content.

The aqueous ink composition of the invention may contain polymerizable compounds other than the specific polymerizable compound insofar as the effects of the invention are not impaired.

Examples of the other polymerizable compounds include any compound insofar as the compound is a polymerizable compound having a radically-polymerizable ethylenically-unsaturated bond, is a compound having at least one radically-polymerizable ethylenically-unsaturated bond in the molecule, and is a compound other than the specific polymerizable compound. Examples include one having a chemical form, such as a monomer, an oligomer, or a polymer.

The other polymerizable compounds may be used alone or in combination of two or more kinds thereof with arbitrary ratios in order to improve the target properties.

Examples of the polymerizable compound having an ethylenically unsaturated bond include unsaturated carboxylic acid, such as acrylic acid, methacrylic acid, itaconic acid, crotonic acid, isocrotonic acid, and maleic acid, and a salt or a derivative thereof, anhydrides having an ethylenically unsaturated group, and radically polymerizable compounds, such as acrylonitrile, styrene, various unsaturated polyesters, unsaturated polyethers, unsaturated polyamides, and unsaturated urethanes.

Specific examples include acrylic acid derivatives, such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylol methane tetraacrylate, oligo ester acrylate, N,N-dimethylamino acrylamide, N,N-dimethylaminoethyl acrylamide, N,N-dimethylaminopropyl acrylamide, quaternized compounds thereof, N-methylol acrylamide, hydroxyethyl acrylamide, hydroxypropyl acrylamide, 4-acryloyl morpholine, N-[1,1-dimethyl-2-(sodiooxysulfonyl)ethyl]acrylamide, diacetone acrylamide, and epoxy acrylate, methacrylic acid derivatives, such as methyl methacrylate, n-butyl methacrylate, 2-ethylhexyl methacrylate, lauryl methacrylate, allyl methacrylate, glycidyl methacrylate, benzyl methacrylate, dimethylamino methyl methacrylate, 1,6-hexanediol dimethacrylate, ethyleneglycol dimethacrylate, triethyleneglycol dimethacrylate, polyethyleneglycol dimethacrylate, polypropyleneglycol dimethacrylate, trimethylolethane trimethacrylate, trimethylolpropane trimethacrylate, 2,2-bis(4-methacryloxy polyethoxyphenyl)propane, N,N-dimethylamino methacrylamide, N,N-dimethylaminoethyl methacrylamide, and N,N-dimethylaminopropyl methacrylamide, and derivatives of allyl compounds, such as allyl glycidyl ether, diallylphthalate, and triallyl trimellitate.

In particular, water-soluble polymerizable compounds having an ethylenically unsaturated bond are preferable from the viewpoint of the jetting stability of the ink composition. The "water solubility" used herein is the same as the "water solubility" in the specific polymerizable compound.

Preferable examples of the water-soluble polymerizable compounds having an ethylenically unsaturated bond include at least one selected from acrylic acid, methacrylic acid, an ester derivative thereof, an amide derivative thereof, and a salt thereof. Examples include acrylic acid monoester and methacrylic acid monoester (hereinafter sometimes referred to as a "mono(meth)acrylate"), ester of acrylic acid and a polyol compound and ester of methacrylic acid and a polyol compound (hereinafter sometimes referred to as a "polyfunctional (meth)acrylate monomer" or a "polyfunctional (meth)acrylate oligomer"), acrylamide, methacrylamide, and a derivative thereof.

The water-soluble polymerizable compound having an ethylenically unsaturated bond for use in the invention preferably has at least one of a poly(ethyleneoxy) chain, a poly(propyleneoxy) chain, an ionic group (e.g., a carboxy group and a sulfo group), and a hydroxy group from the viewpoint of imparting water solubility.

When the water-soluble polymerizable compound having an ethylenically unsaturated bond has a poly(ethyleneoxy) chain or a poly(propyleneoxy) chain, the number of ethylene oxy units and propylene oxy units is preferably in the range of 1 to 10 and more preferably in the range of 1 to 5. When the number of the units is 10 or less, the hardness of the cured film and the adhesion of the cured film to a recording medium are improved.

The content of the other polymerizable compounds in the ink composition in the invention is preferably in the range of 0.1 to 50% by mass, more preferably in the range of 0.5 to 40% by mass, and still more preferably in the range of 1.0 to 30% by mass in terms of the solid content.

The content ratio of the other polymerizable compounds relative to the specific polymerizable compound is preferably in the range of 0 to 80% by mass, more preferably in the range of 0 to 70% by mass, and still more preferably in the range of 0 to 60% by mass in terms of the solid content.

(Polymerization Initiator)

The aqueous ink composition of the invention contains at least one polymerization initiator. As the polymerization initiator, known polymerization initiators can be used without particular limitation. As the polymerization initiator in the invention, a photopolymerization initiator is preferably used.

Examples of a preferable photopolymerization initiator usable in the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon halogen bond, and (m) alkylamine compounds.

Specific examples of the polymerization initiator include the polymerization initiators described on pages 65 to 148 of "Shigaisen Koka Shisutemu (Ultraviolet Ray-Curing System)" written by Kiyoshi KATO (published by Sogo Gijutsu Center K.K. (1988)), for example.

As the polymerization initiator in the invention, a polymerization initiator in which a water-insoluble initiator has been dispersed in water and a water-soluble initiator can be used, and a water-soluble polymerization initiator is preferable. The "water solubility" in the polymerization initiator means that the polymerization initiator dissolves in 25° C. distilled water in an amount of 0.5% by mass or more. The water-soluble polymerization initiator dissolves in 25° C. distilled water in an amount of preferably 1% by mass or more and more preferably 3% by mass or more.

In the invention, the polymerization initiator may be used alone or in combination of two or more kinds thereof.

The content of the polymerization initiator in the aqueous ink composition of the invention is preferably in the range of 0.1 to 30% by mass, more preferably in the range of 0.5 to 20% by mass, and still more preferably in the range of 1.0 to 15% by mass in terms of the solid content.

The content of the polymerization initiator in the aqueous ink composition of the invention is preferably in the range of 0.01 to 35 parts by mass, more preferably 0.1 to 30 parts by mass, and still more preferably 0.5 to 30 parts by mass based on 100 parts by mass of the polymerizable compound. Here, the content of the polymerization initiator refers to the total content of the polymerization initiators in the aqueous ink composition, and the content of the polymerizable compound refers to the total content of the polymerizable compounds (the specific polymerizable compounds and other polymerizable compounds contained as required) in the aqueous ink composition.

(Coloring Agent)

The ink composition in the invention preferably contains at least one coloring agent. As the coloring agent in the invention, known dyes, pigments, and the like can be used without particular limitation. In particular, coloring agents that are almost insoluble or difficult to dissolve in water are preferable from the viewpoint of ink coloring properties. Specific examples include various pigments, disperse dyes, oil-soluble dyes, and coloring matter forming a J-aggregate. From the viewpoint of lightfastness, pigments are more preferable.

The pigment in the invention is not particularly limited in the type, and known organic and inorganic pigments can be used.

Examples of the organic pigments include azo pigments, polycyclic pigments, dye chelates, nitro pigments, nitroso pigments, and aniline black. Among the above, azo pigments, polycyclic pigments, and the like are more preferable. Examples of the azo pigments include azo lakes, insoluble azo pigments, condensed azo pigments, and chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments. Examples of the dye chelates include basic dye type chelates and acid dye type chelates.

Examples of the inorganic pigments include titanium oxide, iron oxide, calcium carbonate, barium sulfate, aluminum hydroxide, barium yellow, cadmium red, chrome yellow, and carbon black. Among the above, carbon black is particularly preferable. Examples of the carbon black include those manufactured by known methods, such as a contact method, a furnace method, or a thermal method.

Specific examples of the pigments usable in the invention include the pigments described in Paragraphs [0142] to [0145] of JP-A No. 2007-100071.

When dyes are used as the coloring agent in the invention, dyes supported on water-insoluble carriers can be used. As the dyes, known dyes can be used without particular limitation and the dyes described in, for example, JP-A Nos. 2001-115066, 2001-335714, and 2002-249677 can be suitably used also in the invention. As the carriers, inorganic materials, organic materials, and composite materials thereof can be used without particular limitation insofar as they are insoluble or difficult to dissolve in water. Specifically, the carriers described in, for example, JP-A Nos. 2001-181549 and 2007-169418 can be suitably used also in the invention.

The carriers carrying dyes (coloring agents) can be used as they are or in combination with dispersants, as required. As the dispersants, the dispersants described later can be suitably used.

The pigments described above may be used alone or in combination of two or more kinds of pigments selected from any one or more of the groups described above.

The content of the coloring agent (particularly pigment) in the aqueous ink composition is preferably 1 to 25% by mass and more preferably 5 to 20% by mass based on the total mass of the ink composition from the viewpoint of color density, granularity, ink stability, and jetting reliability.

(Dispersant)

When the coloring agent in the invention is a pigment, it is preferable to constitute colored particles dispersed in an aqueous solvent by a dispersant. As the dispersant, polymer dispersants or low molecular weight surfactant type dispersants may be used. As the polymer dispersants, any of water-soluble polymer dispersants and water-insoluble polymer dispersants may be used.

In the invention, water-insoluble polymer dispersants are preferable from the viewpoint of dispersion stability and jetting properties when applied to an ink-jet method.

—Water-Insoluble Polymer Dispersant—

As the water-insoluble polymer dispersant in the invention (hereinafter sometimes simply referred to as a "dispersant"), known water-insoluble polymer dispersants can be used without particular limitation insofar as they are water-insoluble polymers and can disperse pigments. The water-insoluble polymer dispersants can contain both a hydrophobic constituent unit and a hydrophilic constituent unit, for example.

Examples of monomers for constituting the hydrophobic constituent unit include a styrene monomer, alkyl(meth)acrylate, and (meth)acrylate containing an aromatic group.

Monomers for constituting the hydrophilic constituent unit are not particularly limited insofar as they are monomers containing hydrophilic groups. Examples of the hydrophilic groups include a nonionic group, a carboxyl group, a sulfonic acid group, and a phosphoric acid group. Examples of the nonionic group include a hydroxy group, an amide group (in which the nitrogen atom is not substituted), a group derived from an alkylene oxide polymer (e.g., polyethylene oxide and polypropylene oxide) and a group derived from sugar alcohol.

The hydrophilic constituent unit in the invention preferably contains at least a carboxyl group from the viewpoint of dispersion stability and also preferably contains both a nonionic group and a carboxyl group.

Specific examples of the water-insoluble polymer dispersant in the invention include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol(meth)acrylate-(meth) acrylic acid copolymer, and a styrene-maleic acid copolymer.

Here, the "(meth)acrylic acid" refers to acrylic acid or methacrylic acid.

In the invention, the water-insoluble polymer dispersant is preferably a vinyl polymer containing a carboxyl group and more preferably a vinyl polymer having at least a constituent unit derived from an aromatic group-containing monomer as the hydrophobic constituent unit and having a constituent unit containing a carboxyl group as the hydrophilic constituent unit from the viewpoint of the dispersion stability of pigments.

The weight average molecular weight of the water-insoluble polymer dispersant is preferably 3,000 to 200,000, more preferably 5,000 to 100,000, still more preferably 5,000 to 80,000, and particularly preferably 10,000 to 60,000 from the viewpoint of the dispersion stability of pigments.

The content of the dispersant in the colored particles in the invention is preferably 10 to 100% by mass, more preferably 20 to 70% by mass, and particularly preferably 30 to 50% by mass relative to the content of the pigment from the viewpoint of the dispersibility, ink coloring properties, and dispersion stability of the pigment.

When the content of the dispersant in the colored particles is in the range mentioned above, the pigment is coated with a proper amount of dispersants, and colored particles having a small particle size and excellent stability with time are tend to be easily obtained. Thus, the content mentioned above is preferable.

The colored particles in the invention may contain other dispersants in addition to the water-insoluble polymer dispersant. For example, known water-soluble low molecular weight dispersants, water-soluble polymers, and the like can be used. The content of dispersants other than the water-insoluble polymer dispersant can be adjusted within the range of the content of the dispersant described above.

The coloring agent in the invention preferably contains the pigment and the water-insoluble polymer dispersant from the viewpoint of dispersion stability and jetting properties, and preferably has a structure in which at least a part of the surface of the pigment is coated with the water-insoluble polymer dispersant. Such a coloring agent can be obtained as a dispersion of colored particles by, for example, dispersing a mixture containing, for example, a pigment and a dispersant and, as required, a solvent (preferably organic solvent) with a dispersing device.

The dispersion of the colored particles can be manufactured as a dispersion by, for example, a process for adding an aqueous solution containing a basic substance to a mixture of the pigment, the water-insoluble polymer dispersant, and an organic solvent that dissolves or disperses the dispersant (mixing•hydrating process), and a subsequent process for removing the organic solvent (solvent removal process). Thus, the coloring agent is finely dispersed, and a dispersion of the colored particles excellent in storage stability can be produced.

The organic solvent needs to be able to dissolve or disperse the dispersant and, in addition thereto, preferably has a certain degree of affinity with water. Specifically, the solubility in water under 20° C. is preferably from 10% by mass to 50% by mass.

More specifically, the dispersion of the colored particles can be manufactured by a manufacturing method including the following processes (1) and (2) but the manufacturing method is not limited thereto.

Process (1): Process for dispersing a mixture containing a pigment, a dispersant, and an organic solvent that dissolves or disperses the dispersant, and a solution containing a basic substance and containing water as the main component, and Process (2); Process for removing at least a part of the organic solvent from the mixture after the dispersion treatment.

In the process (1), first, the dispersant is dissolved or dispersed in an organic solvent, thereby obtaining a mixture (mixing process). Next, a solution containing a coloring agent and a basic substance and containing water as the main component, water and, as required, a surfactant and the like are added to the mixture obtained above, mixed, and dispersed, thereby obtaining an oil-in-water dispersion.

The basic substance is used for neutralizing an anionic group (preferably a carboxyl group) which is sometimes contained in a polymer. The degree of neutralization of the anionic group is not particularly limited. Usually, the dispersion of the colored particles to be finally obtained has a pH of preferably 4.5 to 10, for example. The pH can also be determined in accordance with a desired degree of neutralization of the polymer.

Preferable examples of the organic solvent include alcohol solvents, ketone solvents, and ether solvents. Among the above, examples of the alcohol solvents include ethanol, isopropanol, n-butanol, tertiary butanol, isobutanol, and diacetone alcohol. Examples of the ketone solvents include acetone, methyl ethyl ketone, diethyl ketone, and methyl isobutyl ketone. Examples of the ether solvents include dibutyl ether, tetrahydrofuran, and dioxane. Among the solvents, isopropanol, acetone, and methyl ethyl ketone are preferable and methyl ethyl ketone is particularly preferable. The organic solvents may be used alone or in combination of two or more kinds thereof.

In the manufacturing of the dispersion of the colored particles, kneading and dispersion treatment can be performed while giving strong shearing force using a two-roll mill, a three-roll mill, a ball mill, a tron mill, a disper, a kneader, a co-kneader, a homogenizer, a blender, a uniaxial or biaxial extruder, or the like. The details of kneading and dispersion are described in "Paint Flow and Pigment Dispersion" written by T. C. Patton (published by John Wiley and Sons, 1964), etc.

As required, the dispersion of the colored particles can be obtained by performing fine dispersion treatment using beads made of glass, zirconia, or the like having a particle size of 0.01 to 1 mm using a vertical or horizontal type sand grinder, a pin mill, a slit mill, an ultrasonic dispersion device, or the like.

The removal of the organic solvent in the method for manufacturing the colored particles dispersion can be achieved by known methods, such as distillation under reduced pressure, without being particularly limited.

The colored particles in the dispersion of the colored particles thus obtained maintain a favorable dispersion state, and the obtained dispersion of the colored particles achieves excellent stability with time.

In the invention, the volume average particle diameter of the coloring agent (or colored particles) is preferably 10 to 200 nm, more preferably 10 to 150 nm, and still more preferably 10 to 100 nm. When the volume average particle diameter is 200 nm or less, the color reproduction properties become favorable and, in the case of an inkjet method, drop jetting properties become favorable. When the volume average particle diameter is 10 nm or more, the lightfastness becomes favorable.

The particle size distribution of the coloring agent (or colored particles) is not particularly limited and may be any of a broad particle size distribution or a monodispersed particle size distribution. Two or more kinds of coloring agents having a monodispersed particle size distribution may be mixed.

The volume average particle diameter and the particle size distribution of the coloring agent (or colored particles) can be measured using a light scattering method, for example.

In the invention, the coloring agent (or colored particles) may be used alone or in combination of two or more kinds thereof.

(Aqueous Medium)

The ink composition in the invention contains an aqueous medium. The aqueous medium at least contains water and, as required, at least one kind of an organic solvent.

As water in the invention, water not containing ionic impurities, such as ion exchanged water or distilled water, is preferably used. The content of water in the ink composition is suitably selected according to the purpose and is usually preferably 10 to 95% by mass and more preferably 30 to 90% by mass.

—Organic Solvent—

The aqueous medium in the invention preferably contains at least one kind of a water-soluble organic solvent. By blending the water-soluble organic solvent, the effect of preventing drying, moisturizing or promoting penetration can be obtained. For preventing drying, the water-soluble organic solvent is used as an anti-drying agent that prevents the formation of an aggregate due to adhesion and drying of ink, which leads to clogging of an ink jetting hole of a jetting nozzle. For preventing drying or moisturizing, water-soluble organic solvents having a vapor pressure lower than that of water are preferable. The water-soluble organic solvent can be used as a penetration accelerator that increases the penetration of ink into paper.

Examples of the water-soluble organic solvent include alkane diol (polyvalent alcohols), such as glycerine, 1,2,6-hexanetriol, trimethylolpropane, ethylene glycol, and propylene glycol; sugar alcohols; alkyl alcohols having 1 to 4 carbon atoms, such as ethanol, methanol, butanol, propanol, and isopropanol; and glycol ethers, such as ethylene glycol monomethyl ether, ethylene glycol monoethyl ether, ethylene glycol monobutyl ether, ethylene glycol monomethyl-ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. These substances can be used alone or in combination of two or more kinds thereof.

For the purpose of preventing drying or moisturizing, polyvalent alcohols are useful. Examples include glycerin, ethylene glycol, diethylene glycol, triethylene glycol, propylene glycol, dipropylene glycol, tripropylene glycol, 1,3-butanediol, and 2,3-butanediol. These substances may be used alone or in combination of two or more kinds thereof.

For the purpose of promoting penetration, polyol compounds are preferable and aliphatic diols are suitable. Examples of the aliphatic diols include 2-ethyl-2-methyl-1,3-propane diol, 3,3-dimethyl-1,2-butanediol, 2,2-diethyl-1,3-propane diol, 2-ethyl-1,3-hexanediol, and 2,2,4-trimethyl-1,3-pentane diol. Among the above, preferable examples include 2-ethyl-1,3-hexanediol and 2,2,4-trimethyl-1,3-pentane diol.

The water-soluble organic solvent in the invention preferably contains at least one kind of the compound represented by the following Formula (1) in terms of suppressing the occurrence of curling of a recording medium.

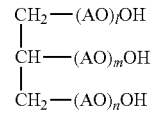

Formula (1)

In Formula (1), l, m, and n each independently represent an integer of 1 or more and satisfy l+m+n=3 to 15, in which the range of l+m+n is preferably 3 to 12 and more preferably 3 to 10. When the value of l+m+n is 3 or more, the curl suppression force is favorable, and when the value of l+m+n is 15 or less, favorable jetting properties are obtained. In Formula (1), AO represents at least either one of ethylene oxy (EO) and propylene oxy (PO), and particularly a propylene oxy group is preferable. Each AO in $(AO)_l$, $(AO)_m$, and $(AO)_n$ above may be the same or different from each other.

Hereinafter, examples of the compound represented by Formula (1) will be shown. However, the invention is not limited thereto. In the Exemplified Compounds, the description "POP(3) glyceryl ether" refers to glyceryl ether in which three propylene oxy groups are bonded to glycerin in total, and the same applies to the other descriptions.

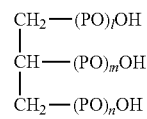

l+m+n=3 POP (3) glyceryl ether
l+m+n=4 POP (4) glyceryl ether
l+m+n=5 POP (5) glyceryl ether
l+m+n=6 POP (6) glyceryl ether
l+m+n=7 POP (7) glyceryl ether The water-soluble organic solvent in the invention is also preferably a water-soluble organic solvent shown below in terms of suppressing the occurrence of curling of a recording medium.

n-$C_4H_9O(AO)_4$—H (AO=EO or PO, Ratio: EO:PO=1:1)
n-$C_4H_9O(AO)_{10}$—H (AO=EO or PO, Ratio: EO:PO=1:1)
$HO(AO)_{40}$—H (AO=EO or PO, Ratio: EO:PO=1:3)
$HO(AO)_{55}$—H (AO=EO or PO, Ratio: EO:PO=5:6)
$HO(PO)_3$—H
$HO(PO)_7$—H
1,2-hexanediol The content ratio of the compound represented by Formula (1) and the Exemplified Compounds in the total of the water-soluble organic solvents is preferably 3% by mass or more, more preferably 4% by mass or more, and still more preferably 5% by mass or more. By adjusting the content in the range above, curling can be suppressed without deteriorating the stability or jetting properties of ink. Thus, the range is preferable.

In the invention, the water-soluble organic solvents may be used alone or as a mixture of two or more kinds thereof.

The content of the water-soluble organic solvent in the ink composition is preferably from 1% by mass to 60% by mass and more preferably from 5% by mass to 40% by mass.

(Resin Particles)

The ink composition in the invention preferably contains at least one kind of resin particles. By blending resin particles, the fixability of the ink composition to a recording medium, the scratch resistance of the image, and blocking resistance can be effectively improved.

The resin particles preferably have a function of fixing the ink composition, i.e., the image, by increasing the viscosity of ink by aggregation or destabilization of dispersion when contacting the treatment liquid or a region on a recording medium where the treatment liquid is dried. Such resin particles are preferably dispersed in water and at least one kind of the organic solvent.

Examples of the resin particles in the invention include acrylic resin, vinyl acetate resin, styrene-butadiene resin, vinyl chloride resin, acrylic-styrene resin, butadiene resin, styrene resin, crosslinked acrylic resin, crosslinked styrene resin, benzoguanamine resin, phenol resin, silicone resin, epoxy resin, urethane resin, paraffin resin, and fluororesin or a latex thereof. Preferable examples include acrylic resin, acrylic-styrene resin, styrene resin, crosslinked acrylic resin, and crosslinked styrene resin.

The resin particles can also be used in the form of latex.

The weight average molecular weight of the resin particles is preferably from 10,000 to 200,000 and more preferably from 100,000 to 200,000.

The volume average particle diameter of the resin particles is preferably in the range of 10 nm to 1 μm, more preferably in the range of 10 to 200 nm, still more preferably in the range of 20 to 100 nm, and particularly preferably in the range of 20 to 50 nm.

The glass transition temperature Tg of the resin particles is preferably 30° C. or more, more preferably 40° C. or more, and still more preferably 50° C. or more.

The addition amount of the resin particles is preferably 0.1 to 20% by mass, and still more preferably 0.1 to 15% by mass relative to the mass of the ink.

The particle size distribution of the resin particles is not particularly limited and may be any of a broad particle size distribution or a monodispersed particle size distribution. Two or more kinds of resin particles having a monodispersed particle size distribution may be mixed for use.

(Surfactant)

The ink composition in the invention can contain at least one kind of a surfactant as required. The surfactant can be used as a surface tension adjusting agent.

As the surface tension adjusting agent, compounds having both a hydrophilic portion and a hydrophobic portion in the molecule and the like can be effectively used, and all of the anionic surfactants, cationic surfactants, amphoteric surfactants, nonionic surfactants, and betaine surfactants can be used. The dispersant (high molecular weight dispersant) described above can also be used as the surfactant.

In the invention, from the viewpoint of suppressing interference of jetted ink droplets, the nonionic surfactants are preferable and particularly an acetylene glycol derivative is more preferably.

When the surfactant (surface tension adjusting agent) is blended in the ink composition, the surfactant is preferably contained in a range such that the surface tension of the ink composition can be adjusted to 20 to 60 mN/m from the viewpoint of favorably jetting the ink composition by an ink-jet method and, in terms of the surface tension, the surface tension is more preferably 20 to 45 mN/m and still more preferably 25 to 40 mN/m.

The above range of the surface tension is preferable, but the amount of the surfactant in the ink composition is not particularly limited, and is preferably 1% by mass or more, more preferably 1 to 10% by mass, and still more preferably 1 to 3% by mass.

(Other Ingredients)

The ink composition can further contain various additives as other ingredients as required in addition to the ingredients described above.

Examples of the various additives include known additives, such as a UV absorber, a fading inhibitor, an antifungal agent, a pH adjuster, a rust-preventive agent, an antioxidant, an emulsion stabilizer, an antiseptic, an antifoaming agent, a viscosity adjuster, a dispersion stabilizer, a chelating agent, and a solid wetting agent.

Examples of the UV absorber include a benzophenone UV absorber, a benzotriazole UV absorber, a salicylate UV absorber, a cyanoacrylate UV absorber, and a nickel complex salt UV absorber.

Examples of the fading inhibitor include various kinds of organic and metal complex fading inhibitors. Examples of the organic fading inhibitor include hydroquinones, alkoxy phenols, dialkoxy phenols, phenols, anilines, amines, indans, chromans, alkoxy anilines, and heterocycles. Examples of the metal complex include a nickel complex and a zinc complex.

Examples of the antifungal agent include sodium dehydroacetate, sodium benzoate, sodium pyridinethion-1-oxide, p-hydroxybenzoic acid ethyl ester, 1,2-benzisothiazoline-3-on, sodium sorbate, and sodium pentachlorophenol.

The content of the antifungal agent in the ink composition is preferably in the range of 0.02 to 1.00% by mass.

As the pH adjuster, any pH adjuster can be suitably selected according to the purpose without particular limitation insofar as the pH can be adjusted to a desired value without adversely affecting the ink composition to be prepared. Examples include alcohol amines (e.g., diethanolamine, triethanolamine, and 2-amino-2-ethyl-1,3-propanediol) alkali metal hydroxides (e.g., lithium hydroxide, sodium hydroxide, and potassium hydroxide), ammonium hydroxides (e.g., ammonium hydroxide and quaternary ammonium hydroxide), phosphonium hydroxide, and alkaline metal carbonate.

Examples of the rust-preventive agent include acidic sulfite, sodium thiosulfate, ammonium thiodiglycolate, diisopropylammonium nitrite, pentaerythritol tetranitrate, and dicyclohexylammonium nitrite.

Examples of the antioxidant include a phenolic antioxidant (including a hindered phenolic antioxidant), an amine antioxidant, a sulfur antioxidant, and a phosphorous antioxidant.

Examples of the chelating agent include sodium ethylenediaminetetraacetate, sodium nitrilotriacetate, sodium hydroxyethyl ethylenediamine triacetate, sodium diethylenetriamine pentaacetate, and sodium uramil diacetate.

—Physical Properties of Ink Composition—

The surface tension (25° C.) of the ink composition in the invention is preferably from 20 mN/m to 60 mN/m. The surface tension is more preferably from 20 mN/m to 45 mN/m and still more preferably from 25 mN/m to 40 mN/m.

The surface tension is determined by measuring the ink composition under the condition of 25° C. using an Automatic Surface Tensiometer CBVP-Z (trade name, manufactured by Kyowa Interface Science Co., LTD.).

The viscosity at 25° C. of the ink composition in the invention is preferably from 1.2 mPa·s to 15.0 mPa·s, more preferably 2 mPa·s or more but less than 13 mPa·s, and still more preferably 2.5 mPa·s or more but less than 10 mPa·s.

The viscosity is determined by measuring the ink composition under the condition of 25° using a VISCOMETER TV-22 (trade name, manufactured by TOKI SANGYO CO. LTD).

<Ink Set>

The ink set of the invention contains at least one kind of the aqueous ink composition described above and at least one kind of a treatment liquid containing an aggregating agent capable of forming an aggregate upon contact with the aqueous ink composition.

By forming an image using an ink composition containing a polymerizable compound having an acrylamide structure or the like and a polymerization initiator, and a treatment liquid containing an aggregating agent, an image having a favorable image quality, high curing sensitivity, and excellent blocking resistance are formed.

[Treatment Liquid]

The treatment liquid included in the ink set of the invention contains at least one kind of the aggregating agent capable of forming an aggregate upon contact with the ink composition and, as required, other ingredients.

Since the treatment liquid contains the aggregating agent, an image having favorable image quality and excellent blocking resistance can be formed.

(Aggregating Agent)

The treatment liquid in the invention contains an aggregating agent that aggregates the ingredients in the ink composition. The aggregating agent in the invention can aggregate (fix) the ink composition upon contact with the ink composition on a recording medium, and functions as a fixing agent. For example, in a state where the aggregating agent is present on a recording medium (preferably coated paper) by applying the treatment liquid to the recording medium, droplets of the ink composition are applied and contact the aggregating agent, and thus the ingredients in the ink composition aggregate and the ingredients in the ink composition can be fixed on the recording medium.

Examples of the ingredients for fixing the ingredients in the ink composition include acidic compounds, polyvalent metal salts, and cationic polymers. The ingredients can be used alone or in combination of two or more kinds thereof.

—Acidic Compound—

Preferable examples of the acidic compounds include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, and salts thereof.

Among the above, acidic compounds having high water solubility are preferable. From the viewpoint of reacting with the ink composition and fixing the entire ink, trivalent or lower valent acidic compounds are preferable, and divalent to trivalent acidic compounds are particularly preferable.

The acidic compounds may be used alone or in combination of two or more kinds thereof.

When the treatment liquid contains the acidic compound, the pH (25° C.) of the treatment liquid is preferably 0.1 to 6.8, more preferably 0.5 to 6.0, and still more preferably 0.8 to 5.0.

The content of the acidic compound is preferably 40% by mass or less and more preferably 15 to 40% by mass based on the total mass of the treatment liquid. By adjusting the content of the acidic compound to 15 to 40% by mass, the ingredients in the ink composition can be more efficiently fixed.

The content of the acidic compound is preferably 15% by mass to 35% by mass and more preferably 20% by mass to 30% by mass based on the total mass of the treatment liquid.

The application amount of the acidic compound to the recording medium is not particularly limited insofar as the amount is sufficient for aggregating the ink composition. From the viewpoint of ease of fixation of the ink composition, the application amount is preferably 0.5 g/m$^2$ to 4.0 g/m$^2$ and more preferably 0.9 g/m$^2$ to 3.75 g/m$^2$.

—Polyvalent Metal Salt—

The polyvalent metal salt in the invention is a compound containing a divalent or higher valent metal, such as alkaline earth metals and zinc group metals. Examples include acetates, oxides, and the like of metal ions, such as $Ca^{2+}$, $Cu^{2+}$, and $Al^{3+}$.

In the invention, the aggregation reaction of the ink composition when the ink composition is jetted to a recording medium (preferably coated paper) to which the treatment liquid containing the polyvalent metal salt has been applied can be achieved by reducing the dispersion stability of the particles dispersed in the ink composition, e.g., the coloring agent such as pigments, or particles, such as resin particles, and increasing the viscosity of the entire ink composition. For example, when the pigments or the particles, such as resin particles, in the ink composition have weak acid functional groups, such as a carboxyl group, the particles are stably dispersed due to the action of the weak acid functional groups but the dispersion stability can be reduced by reducing the surface charge of the particles by interaction with the polyvalent metal salts. Accordingly, from the viewpoint of the aggregation reaction, the polyvalent metal salt as a fixing agent contained in the treatment liquid needs to be divalent or higher valent, i.e., polyvalent, and, from the viewpoint of the aggregation reactivity, the polyvalent metal salt is preferably a polyvalent metal salt containing a trivalent or higher valent metal ion.

From the viewpoints described above, the polyvalent metal salt usable in the treatment liquid in the invention is preferably at least any one of salts of the polyvalent metal ions and negative ions described below, polyaluminum hydroxide, and polyaluminum chloride.

Examples of the polyvalent metal ions include $Ca^{2+}$, $Cu^{2+}$, $Ni^{2+}$, $Mg^{2+}$, $Sr^{2+}$, $Zn^{2+}$, $Ba^{2+}$, $Al^{3+}$, $Fe^{3+}$, $Cr^{3+}$, $Co^{3+}$, $Fe^{2+}$, $La^{3+}$, $Nd^{3+}$, $Y^{3-}$, and $Zr^{4+}$. In order to blend the polyvalent metal ions into the treatment liquid, salts of the polyvalent metals may be used.

The salts refer to metal salts containing the polyvalent metal ions described above and negative ions to be bonded to the ions, and are preferably soluble in a solvent. Here, the solvent refers to a medium constituting the treatment liquid with the polyvalent metal salts and examples include water or organic solvents.

Examples of preferable negative ions for forming salts with the polyvalent metal ions include $Cl^-$, $NO_3^-$, $I^-$, $Br^-$, $ClO_3^-$, $CH_3COO^-$, and $SO_4^{2-}$.

The polyvalent metal ions and the negative ions can form salts of the polyvalent metal ions and the negative ions using the polyvalent metal ions and the negative ions alone or in combination of two or more kinds thereof.

Examples of polyvalent metal salts other than the above include polyaluminum hydroxide and polyaluminum chloride.

In the invention, in terms of reactivity or coloring properties and ease of handling, the salts of the polyvalent metal ions and the negative ions are preferably used. As the polyvalent metal ions, at least one selected from $Ca^{2+}$, $Mg^{2-}$, $Sr^{2+}$, $Al^{3+}$, and $Y^{3+}$ is preferable and $Ca^{2+}$ is more preferable.

As the negative ions, $NO_3^-$ is particularly preferable from the viewpoint of solubility or the like.

The polyvalent metal salts can be used alone or as a mixture of two or more kinds thereof.

The content of the polyvalent metal salts may be 15% by mass or more based on the total mass of the treatment liquid. By adjusting the content of the polyvalent metal salts to 15% by mass or more, the ingredients in the ink composition can be more effectively fixed.

The content of the polyvalent metal salts is preferably 15% by mass to 35% by mass and more preferably 20% by mass to 30% by mass based on the total mass of the treatment liquid.

The application amount of the polyvalent metal salts to a recording medium is not particularly limited insofar as the amount is sufficient for aggregating the ink composition. From the viewpoint of ease of fixation of the ink composition, the amount is preferably 0.5 g/m² to 4.0 g/m² and more preferably 0.9 g/m² to 3.75 g/m².

—Cationic Polymer—

Examples of cationic polymers include at least one kind of a cationic polymer selected from poly(vinylpyridine) salts, polyalkylaminoethyl acrylate, polyaklylaminoethyl methacrylate, poly(vinylimidazole), polyethyleneimine, polybiguanide, and polyguanide.

The cationic polymers may be used alone or in combination of two or more kinds thereof.

Among the cationic polymers, polyguanide (preferably poly(hexamethylene guanidine)acetate, polymonoguanide, and polymeric biguanide), polyethyleneimine, and poly(vinylpyridine) are preferable because they are advantageous in the aggregation rate.

The weight average molecular weight of the cationic polymer is preferably smaller in terms of the viscosity of the treatment liquid. When the treatment liquid is applied to a recording medium by an ink-jet method, the weight average molecular weight is preferably in the range of 500 to 500,000, more preferably in the range of 700 to 200,000, and still more preferably in the range of 1,000 to 100,000. The weight average molecular weight of 500 or more is advantageous in the aggregation rate and the weight average molecular weight of 500,000 or less is advantageous in the jetting reliability. However, the same does not necessarily apply to the case where the treatment liquid is applied to a recording medium by methods other than the ink-jet method.

When the treatment liquid contains the cationic polymer, the pH (25° C.) of the treatment liquid is preferably 1.0 to 10.0, more preferably 2.0 to 9.0, and still more preferably 3.0 to 7.0.

The content of the cationic polymer is preferably 1% by mass to 35% by mass and more preferably 5% by mass to 25% by mass based on the total mass of the treatment liquid.

The application amount of the cationic polymer to a coated paper is not particularly limited insofar as the amount is sufficient for fixing the ink composition. From the viewpoint of ease of fixation of the ink composition, the application amount is preferably 0.5 g/m² to 4.0 g/m² and more preferably 0.9 g/m² to 3.75 g/m².

<Image Forming Method>

A first image forming method of the invention includes at least an ink application process for applying the ink composition onto a recording medium to form an image, and an active energy ray irradiation process for irradiating the ink composition applied onto the recording medium with active energy rays to fix the image, and optionally other processes.

A second image forming method of the invention includes at least a treatment liquid application process for applying the treatment liquid contained in the ink set onto a recording medium and an ink application process for applying the ink composition contained in the ink set onto the recording medium to form an image and an active energy ray irradiation process for irradiating the ink composition applied onto the recording medium with active energy rays to fix the image, and, as required, other processes.

[Recording Medium]

Recording media for use in the image forming method of the invention are not particularly limited, and a cellulose-based general printing paper, such as a so-called high-quality paper, coated paper or art paper for use in general offset printing or the like, may be used. When the cellulose-based general printing paper is used in image recording by a general ink-jet method with an aqueous ink, the ink may be absorbed and dried relatively slowly, so that the coloring material is likely to migrate after jetting ink droplets, which may easily lead to image quality degradation. However, according to the ink-jet recording method of the invention, the migration of the coloring material can be suppressed, so that high-quality image recording with excellent color density and hue can be achieved.

Generally commercially available recording media can be used as the recording media. Examples include high-quality paper (A), such as "OK PRINCE HIGH-QUALITY" (trade name) manufactured by Oji paper Co., Ltd., "SHIORAI" (trade name) manufactured by Nippon Paper Industries Co., Ltd. and "NEW NPI HIGH-QUALITY" (trade name) manufactured by Nippon Paper Industries Co., Ltd.; high-quality coated paper, such as "SILVER DIAMOND" manufactured by Nippon Paper Industries Co., Ltd.; lightly coated paper, such as "OK EVER LIGHT COAT" (trade name) manufactured by Oji paper Co., Ltd. and "AURORA S" (trade name) manufactured by Nippon Paper Industries Co., Ltd.; lightweight coated paper (A3), such as "OK COAT L" (trade name) manufactured by Oji paper Co., Ltd. and "AURORA L" (trade name) manufactured by Nippon Paper Industries Co., Ltd.; coated paper (A2, B2), such as "OK TOP COAT+" (trade name) manufactured by Oji paper Co., Ltd. and "AURORA COAT" (trade name) manufactured by Nippon Paper Industries Co., Ltd.; and art paper (A1), such as "OK KINFUJI+" (trade name) manufactured by Oji paper Co., Ltd. and "TOKUBISHI ART" (trade name) manufactured by Mitsubishi Papers Mills Ltd. Moreover, various types of photo paper for ink-jet recording can also be used.

Among the above, from the viewpoint of obtaining a high-quality image having better color density and hue in which the effect of suppressing coloring material migration is high, the recording medium has a water absorption coefficient Ka of preferably 0.05 to 0.5 mL/m$^2$·ms$^{1/2}$, more preferably 0.1 to 0.4 mL/m$^2$·ms$^{1/2}$, and still more preferably 0.2 to 0.3 mL/m$^2$·ms$^{1/2}$.

The water absorption coefficient Ka has the same meaning as that described in JAPAN TAPPI pulp and paper test method No. 51:2000 (published by Japan Technical Association of the Pulp and Paper Industry). Specifically, the water absorption coefficient Ka is calculated from the difference in the amount of transferred water between at a contact time of 100 ms and at a contact time of 900 ms measured with an automatic scanning liquid absorptometer KM500Win (trade name, manufactured by Kumagai Riki Kogyo Co., Ltd.).

Among the recording media, a so-called coated paper for use in general offset printing is preferable. The coated paper is obtained by applying a coating material to the surface of non-surface-treated cellulose-based general high-quality paper, neutralized paper or the like to form a coating layer thereon. In usual aqueous inkjet image forming, the coated paper is likely to cause problems in quality, such as image glossiness or scratch resistance. However, in the ink-jet recording method of the invention, uneven glossiness can be reduced, and an image having favorable glossiness and scratch resistance can be obtained. In particular, coated paper having a base paper and a coating layer containing kaolin and/or calcium bicarbonate is preferably used. More specifically, art paper, coated paper, lightweight coated paper, or lightly coated paper is more preferable.

[Treatment Liquid Application Process]

In a treatment liquid application process, a treatment liquid that contains an aggregating agent and may contain an acid generating agent, contained in the ink set, is applied onto a recording medium. For the application of the treatment liquid to the recording medium, known liquid application methods can be used without particular limitation, and arbitrary methods, such as spray coating, coating with a coating roller, application by an ink-jet method, or immersion, can be selected.

Specific examples include size press methods such as a horizontal size press method, a roll coater method, a calendar size press method, or the like; knife coater methods such as an air knife coater method or the like; roll coater methods such as a transfer roll coater method, such as a gate roll coater method, a direct roll coater method, a reverse roll coater method, a squeeze roll coater method, or the like; blade coater methods such as a billblade coater method, a short dwell coater method, a two stream coater method, or the like; bar coater methods such as a rod bar coater method or the like; a cast coater method; a gravure coater method; a curtain coater method; a die coater method; a brush coater method; and a transfer method.

Furthermore, a method in which coating is performed while controlling the coating amount using a coating apparatus having a liquid amount controlling member as in the case of the coating apparatus described in JP-A No. 10-230201 may be used.

The treatment liquid may be applied over the entire surface of the recording medium, i.e., entire surface application, or may be applied to a region where ink-jet recording is performed in an ink application process, i.e., partial surface application. In the invention, from the viewpoint of uniformly adjusting the application amount of the treatment liquid, uniformly recording fine lines, fine image portions, or the like, and suppressing image unevenness, such as density unevenness, the entire surface application of applying the treatment liquid over the entire surface of a coated paper by coating with a coating roller or the like, is preferable.

Examples of a method for applying the treatment liquid while controlling the application amount of the treatment liquid to the range described above include a method of using an anilox roller. The anilox roller is a roller in which the roller surface which is subjected to thermal spray coating with ceramics is processed with laser and is formed into a pyramidal shape, a slant-lined shape, a hexagonal shape, or the like. When the treatment liquid goes into depressions provided on the roller surface, and contacts the paper surface, transfer occurs, and the treatment liquid is applied with an amount controlled by the depressions of the anilox roller.

[Ink Application Process]

In the ink application process in the invention, the ink composition containing the coloring agent, the polymerizable compound, the initiator, and the aqueous medium, contained in the ink set, is applied onto a recording medium. As a method for applying the ink composition, known ink application methods can be used without particular limitation insofar as the ink composition can be applied in the shape of a desired image. Examples include a method for applying the ink composition onto a recording medium by methods, such as an ink-jet method, a copying system, a stamping and transfer system, or the like. In particular, from the viewpoint of reducing the size of a recording device and high-speed recordability, a process for applying the ink composition by an ink-jet method is preferable.

(Ink-Jet Method)

In the image formation by an ink-jet method, the ink composition is jetted onto a recording medium by applying energy, and a colored image is formed. As an ink-jet recording method suitable for the invention, the method described in Paragraphs 0093 to 0105 of JP-A No. 2003-306623 can be applied.

The ink-jet methods are not particularly limited and may be known methods, such as a charge control method including jetting ink utilizing electrostatic attraction force, a drop-on-demand method utilizing the oscillating pressure of piezoelectric elements (pressure pulse method), or an acoustic ink-jet method including converting an electrical signal to an acoustic beam, irradiating the same to ink, and jetting the ink utilizing radiation pressure.

The ink-jet head for use in the ink-jet method may be an on-demand system or a continuous system. Ink nozzles to be used when recording is performed by the ink-jet method are not particularly limited and can be suitably selected according to the purpose.

The ink-jet methods includes a method including jetting a large number of low concentration inks, referred to as a photo ink, with a small volume, a method including using two or more inks having substantially the same hue and having different concentrations and improving the image quality, or a system using colorless and transparent ink.

Examples of the ink-jet method include a shuttle system including performing recording while scanning a short length serial head in the width direction of a recording medium, and a line system using a line head in which recording elements are arranged corresponding to the entire region of one side of a recording medium. In the line system, image recording can be performed on the entire surface of the recording medium by scanning the recording medium in the direction orthogonal to the arrangement direction of the recording elements, and thus carrying systems, such as a carriage that scans a short length head, become unnecessary. Moreover, complicated scanning control of the movement of the carriage and the recording medium becomes unnecessary and only the recording medium moves. Thus, compared with the shuttle system, an increase in the recording rate can be achieved.

In the invention, the order of carrying out the treatment liquid application process and the ink application process is not particularly limited, and an embodiment in which the ink application process is performed after the treatment liquid application process is preferable from the viewpoint of image quality. More specifically, the ink application process is preferably a process for applying the ink composition onto a recording medium to which the treatment liquid has been applied.

[Active Energy Ray Irradiation Process]

The image forming method of the invention preferably includes a process for irradiating the ink composition applied onto the recording medium with an active energy ray. By irradiating an active energy ray, the polymerizable compound contained in the ink composition polymerizes to form a cured film containing a coloring agent. Thus, the scratch resistance and blocking resistance of the image more effectively increase.

The ink composition applied onto the recording medium is cured by irradiating an active energy ray. This is because the initiator contained in the ink composition in the invention decomposes due to the emission of the active energy ray to generate initiation species, such as radicals, acids, and bases, and the initiation species initiate and promote the polymerization reaction of the polymerizable compound, and the ink composition is cured.

The ink composition is further aggregated (fixed) due to an acid supplied from the acid generating agent contained in the treatment liquid during the emission of the active energy ray, and thus the quality of image portions (scratch resistance, blocking resistance, etc.) increases.

Here, examples of the active energy ray to be used include α rays, γ rays, electron beams, X-rays, ultraviolet rays, visible light, and infrared light. The wavelength of the active energy ray is preferably 200 to 600 nm, more preferably 300 to 450 nm, and still more preferably 350 to 420 nm.

The output of active radiation is preferably 5000 mJ/cm$^2$ or less, more preferably 10 to 4000 mJ/cm$^2$, and still more preferably 20 to 3000 mJ/cm$^2$.

As the source of the active energy ray, a mercury lamp or a gas•solid laser, and the like are mainly utilized. As the light source to be used for curing an ultraviolet-ray curing ink-jet recording ink, a mercury lamp and a metal halide lamp are widely known. However, there is a strong need for mercury-free devices from the viewpoint of the current environmental protection. The substitution with a GaN semiconductor ultraviolet ray-emitting device is very useful from the industrial and environmental standpoints. LEDs (UV-LEDs) and LDs (UV-LDs) have a small size, a long lifetime, a high efficiency, and a low cost and thus are attracting attention as light sources for photocuring ink jet.

A light-emitting diode (LED) and a laser diode (LD) can be used as the active radiation source. In particular, an ultraviolet LED or an ultraviolet LD can be used when an ultraviolet ray source is required. For example, a purple LED in which the main emission spectrum has a wavelength between 365 nm and 420 nm is commercially available from Nichia Corporation.

A particularly preferable active energy ray source in the invention is a UV-LED, and a UV-LED having a peak wavelength at 350 to 420 nm is particularly preferable.

[Ink Drying Process]

The image forming method of the invention may have an ink drying process for drying and removing the ink solvents (e.g., water or the water-soluble organic solvent) contained in the ink composition applied onto the recording medium, as required. As the ink drying process, generally used methods can be applied without particular limitation insofar as at least a part of the ink solvent can be removed.

For example, ink drying is performed by known heating measures, such as a heater, an air blowing measure utilizing air blowing, such as a drier, or a combination thereof. Examples of heating methods include a method including giving heat with a heater or the like from the side opposite to the side of the recording medium to which the treatment liquid is applied, a method including blowing warm air or hot air to the surface of the recording medium to which the treatment liquid is applied, and a heating method using an infrared heater, and heating may be performed by combining the methods.

The ink drying process may be performed after the ink application process, and may be before or after the active energy ray irradiation process. In the invention, the ink drying process is preferably performed before the active energy ray irradiation process from the viewpoint of curing sensitivity and blocking resistance.

According to an aspect of the invention, there are provided the following embodiments <1> to <17>.

<1>. An aqueous ink composition comprising:
a water-soluble polymerizable compound containing two or more polymerizable functional groups each selected from the group consisting of a (meth)acrylamide group, a maleimide group, a vinyl sulfone group, and an N-vinyl amide group, wherein a ratio of a molecular weight of the compound relative to a number of the polymerizable functional groups contained in a single molecule of the compound is 175 or less;
a polymerization initiator; and
water.

<2> The aqueous ink composition according to <1>, wherein the ratio of the molecular weight of the compound relative to the number of the polymerizable functional groups contained in a single molecule of the compound is 171 or less.

<3> The aqueous ink composition according to <1> or <2>, wherein the ratio of the molecular weight of the compound relative to the number of the polymerizable functional groups contained in a single molecule of the compound is 84 or more.

<4> The aqueous ink composition according to any one of <1> to <3>, wherein the ratio of the molecular weight of the compound relative to the number of the polymerizable functional groups contained in a single molecule of the compound is 165 or less.

<5> The aqueous ink composition according to any one of <1> to <4>, wherein at least one of the polymerizable functional groups is a (meth)acrylamide group.

<6> The aqueous ink composition according to any one of <1> to <5>, wherein the polymerizable compound does not contain a partial structure represented by the following formula (IVa) or (IVb):

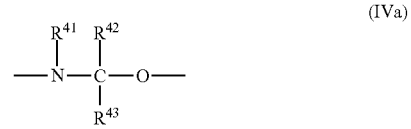

(IVa)

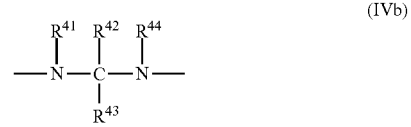

(IVb)

wherein $R^{41}$ to $R^{44}$ each independently represent a hydrogen atom or an alkyl group having 1 to 4 carbon atoms.

<7> The aqueous ink composition according to any one of <1> to <6>, wherein the polymerizable compound is a (meth) acrylamide compound represented by the following formula (V):

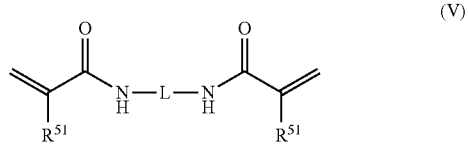

wherein $R^{51}$ represents a hydrogen atom or a methyl group; and L represents a bivalent linking group consisting of at least one selected from the group consisting of an ethylene group, a 1,2-propylene group, a 1,3-propylene group, an oxygen atom, and a (meth)acryloylimino group.

<8> The aqueous ink composition according to any one of <1> to <7>, wherein the polymerizable compound is a (meth) acrylamide compound represented by any one of the following formulae (I) to (III):

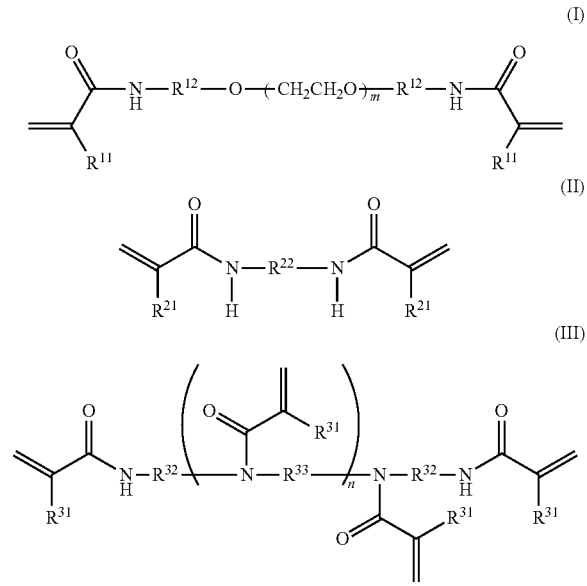

wherein $R^{11}$, $R^{21}$ and $R^{31}$ each independently represent a hydrogen atom or a methyl group; $R^{12}$ and $R^{22}$ each independently represent an ethylene group, a 1,2-propylene group or a 1,3-propylene group; $R^{32}$ and $R^{33}$ each independently represent an ethylene group or a 1,3-propylene group; and m and n each independently represent an integer of from 0 to 2.

<9> The aqueous ink composition according to any one of <1> to <8>, further comprising a pigment.

<10> The aqueous ink composition according to any one of <1> to <9>, wherein the polymerization initiator includes a photopolymerization initiator.

<11> An ink set comprising:
the aqueous ink composition according to any one of <1> to <10>; and
a treatment liquid capable of forming an aggregate upon contact with the aqueous ink composition.

<12> The ink set according to <11>, wherein the treatment liquid contains at least one selected from the group consisting of an acidic compound, a polyvalent metal salt, and a cationic polymer.

<13> An image forming method comprising:
applying the ink composition according to any one of <1> to <10> onto a recording medium to form an image; and
irradiating the ink composition applied onto the recording medium with active energy rays to fix the image.

<14> An image forming method using the ink set according to <11> or <12>, the method comprising:
applying the treatment liquid contained in the ink set onto a recording medium;
applying the ink composition contained in the ink set onto the recording medium to form an image; and
irradiating the ink composition applied onto the recording medium with active energy rays to fix the image.

<15> The image forming method according to <14>, wherein the aqueous ink composition is applied onto the recording medium onto which the treatment liquid has been applied.

<16> The image forming method according to any one of <13> to <15>, wherein the recording medium is a coated paper.

<17> The image forming method according to any one of <13> to <16>, wherein the aqueous ink composition is applied by an ink-jet method.

Therefore, according to the invention, there can be provided an aqueous ink composition excellent in curing sensitivity and in the blocking resistance of the formed image, an ink set, and an image forming method using the same.

EXAMPLES

Hereinafter, the invention will be specifically described with reference to Examples but is not limited to the Examples. Unless otherwise specified, "part(s)" and "%" are all based on mass.

(Synthesis of Polymer Dispersant P-1)
In a 1000 ml three-necked flask having a stirrer and a condenser tube, 88 g of methyl ethyl ketone was placed, and heated to 72° C. under a nitrogen atmosphere. In the flask, a solution in which 0.85 g of dimethyl-2,2-azobisisobutyrate, 60 g of benzyl methacrylate, 10 g of methacrylic acid, and 30 g of methyl methacrylate were dissolved in 50 g of methyl ethyl ketone was added dropwise over 3 hours. After the dropwise addition was completed, the reaction was further continued for one hour. Then, a solution in which 0.42 g of dimethyl 2,2'-azobisisobutyrate was dissolved in 2 g of methyl ethyl ketone was added, and the reaction solution was heated to 78° C. and heated for 4 hours. The obtained reaction solution was reprecipitated twice with an excess amount of hexane, and the precipitated resin was dried, thereby obtaining 96 g of a polymer dispersant P-1.

The composition of the obtained resin was confirmed by $^1$H-NMR. The weight average molecular weight (Mw) was 44,600 as determined by a GPC method. Furthermore, the acid value of the polymer was 65.2 mgKOH/g as determined by the method described in JIS Standard (JIS-K0070 (1992)).

(Preparation of Resin-Coated Pigment Dispersion)
—Resin-Coated Cyan Pigment Dispersion—
10 parts of Pigment Blue 15:3 (PHTHALOCYANINE BLUE A220, trade name, manufactured by Dainichiseika Color & Chemicals Mfg. Co., Ltd), 5 parts of the polymer dispersant P-1, 42 parts of methyl ethyl ketone, 5.5 parts of a 1 mol/L aqueous NaOH solution, and 87.2 parts of ion exchanged water were mixed, and then the mixture was dispersed in a bead mill for 2 to 6 hours using 0.1 mmϕ zirconia beads.

By removing the methyl ethyl ketone and further partially removing water under reduced pressure at 55° C. from the obtained dispersion, a dispersion of a resin-coated cyan pigment (colored particles) having a pigment concentration of 10.2% by mass was obtained.

—Resin-Coated Magenta Pigment Dispersion—

A dispersion of a resin-coated magenta pigment (colored particles) was obtained in the same manner as in the above preparation of the resin-coated cyan pigment dispersion, except using CHROMOPHTHAL JET MAGENTA DMQ (trade name, Pigment Red 122, manufactured by BASF Japan Ltd.) in place of the PHTHALOCYANINE BLUE A220 used as the pigment in the preparation of the resin-coated cyan pigment dispersion.

—Resin-Coated Yellow Pigment Dispersion—

A dispersion of a resin-coated yellow pigment (colored particles) was obtained in the same manner as in the above preparation of the resin-coated cyan pigment dispersion, except using IRGALITE YELLOW GS (trade name, Pigment Yellow 74, manufactured by BASF Japan Ltd.) in place of the PHTHALOCYANINE BLUE A220 used as the pigment in the preparation of the resin-coated cyan pigment dispersion.

(Synthesis of Polymerizable Compound)

—Synthesis of Polymerizable Compound 1—

In a 1 L three-necked flask with a stirrer, 40.0 g (563 mmol) of acrylamide, 57.0 g (282 mmol) of butanediol diglycidyl ether, 15.6 g (113 mmol) of potassium carbonate, 25.7 g (113 mmol) of benzyl triethyl ammonium chloride, and 500 mL of dioxane were placed. The mixture was heated and stirred at 90° C. for 10 hours. The obtained reaction mixture was filtered, the dioxane was distilled off under reduced pressure, 200 mL of saturated sodium chloride solution was added, and then extraction was performed with 300 mL of butanol 3 times. The obtained organic layer was dried over magnesium sulfate, and filtration was performed, and then the solvent was distilled off under reduced pressure, thereby obtaining 58.2 g (169 mmol, 60% yield) of the target polymerizable compound 1.

—Synthesis of Polymerizable Compound 2—

In a 1 L three-necked flask having a stirrer, 40.0 g (182 mmol) of 4,7,10-trioxa-1,13-tridecanediamine, 37.8 g (450 mmol) of sodium bicarbonate, 100 g of water, and 300 mL of tetrahydrofuran were placed, and then 35.2 g (389 mmol) of acrylic acid chloride was added dropwise under ice bath cooling over 20 minutes. After the dropwise addition, the mixture was stirred at room temperature for 5 hours. Thereafter, the tetrahydrofuran was distilled off under reduced pressure from the obtained reaction mixture. Next, the aqueous layer was extracted 4 times with 200 ml of ethyl acetate. The obtained organic layer was dried over magnesium sulfate, filtration was performed, and the solvent was distilled off under reduced pressure, thereby obtaining 35.0 g (107 mmol, 59% yield) of a white solid of the target polymerizable compound 2.

—Synthesis of Polymerizable Compound 3—

In a 1 L three-necked flask having a stirrer, 40.0 g (666 mmol) of ethylene diamine, 90.0 g (2250 mmol) of sodium hydroxide, 200 g of water, and 600 mL of acetonitrile were placed, and then 132.6 g (1470 mmol) of acrylic acid chloride was added dropwise under ice bath cooling over 1 hour. After the dropwise addition, the mixture was stirred at room temperature for 5 hours. Thereafter, the acetonitrile was distilled off under reduced pressure from the obtained reaction mixture. Next, the aqueous layer was extracted 3 times with 400 ml of chloroform. The obtained organic layer was dried over magnesium sulfate, filtration was performed, and the solvent was distilled off under reduced pressure, thereby obtaining 45.0 g (266 mmol, 40% yield) of a white solid of the target polymerizable compound 3.

—Synthesis of Polymerizable Compound 4—

In a 1 L three-necked flask having a stirrer, 40.0 g (270 mmol) of 1,2-bis(2-aminoethoxy)ethane, 53.0 g (540 mmol) of maleic anhydride, and 200 mL of acetic acid were added. The mixture was heated and stirred at 130° C. for 5 hours. The obtained reaction mixture was slowly poured in 500 mL of a 6N aqueous potassium carbonate solution, a salt was added, and extraction was performed with 600 mL of butanol 3 times. The obtained organic layer was dried over magnesium sulfate, filtration was performed, and the solvent was distilled off under reduced pressure, thereby obtaining 41.6 g (135 mmol, 50% yield) of the target polymerizable compound 4.

—Synthesis of Polymerizable Compound 5—

In a 1 L three-necked flask having a stirrer, 32.6 g (200 mmol) of 2-chloroethane sulfonyl chloride and 200 mL of methylene chloride were placed, and then 20.2 g (200 mmol) of triethylamine was added at −78° C. The mixture was stirred for 1 hour, and then stirred at 0° C. for 2 hours. To the reaction mixture, 14.8 g (100 mmol) of 1,2-bis(2-aminoethoxy)ethane and 20.2 g (200 mmol) of triethylamine were slowly added dropwise, and the mixture was stirred at room temperature for 3 hours. Then, the methylene chloride was distilled off under reduced pressure from the obtained reaction mixture. Next, 200 mL of a 0.01M aqueous hydrochloric acid solution was added, a salt was further added, and extraction was performed with 400 ml of ethyl acetate 4 times. Then, the obtained organic layer was washed with aqueous sodium bicarbonate, and dried over magnesium sulfate. Thereafter, filtration was performed, and the solvent was distilled off under reduced pressure, thereby obtaining 25.6 g (78 mmol, 78% yield) of the target polymerizable compound 5.

—Synthesis of Polymerizable Compound 6—

In a 1 L three-necked flask having a stirrer, 40.0 g (270 mmol) of 1,2-bis(2-aminoethoxy)ethane, 26.2 g (594 mmol) of acetaldehyde, and 500 mL of tetrahydrofuran were placed, and the mixture was stirred at room temperature for 5 hours. Thereafter, 50.9 g (648 mmol) of acetyl chloride and 70.8 g (700 mmol) of triethylamine were slowly added, and then stirred for 2 hours. To the reaction mixture, 500 mL of aqueous sodium bicarbonate solution was added, and extraction was performed with 800 ml of ethyl acetate 4 times. Then, the obtained organic layer was washed with an aqueous ammonium chloride solution, and dried over magnesium sulfate. Thereafter, filtration was performed, and the solvent was distilled off under reduced pressure, thereby obtaining 30.7 g (108 mmol, 40% yield) of the target polymerizable compound 6.

—Synthesis of Polymerizable Compound 22—

In a 1 L three-necked flask having a stirrer, 60.1 g (846 mmol) of acrylamide, 73.4 g (282 mmol) of glycerol triglycidyl ether, 23.4 g (169 mmol) of potassium carbonate, 38.5 g (169 mmol) of benzyl triethyl ammonium chloride, and 500 mL of dioxane were added. Then, the mixture was heated and stirred at 90° C. for 10 hours. The obtained reaction mixture was filtered, the dioxane was distilled off under reduced pressure, 200 mL of saturated sodium chloride solution was added, and extraction was performed with 300 mL of butanol 3 times. The obtained organic layer was dried over magnesium sulfate, filtration was performed, and the solvent was distilled off under reduced pressure, thereby obtaining 69.6 g (147 mmol, 52% yield) of the target polymerizable compound 22.

—Synthesis of Polymerizable Compound 7—

Polymerizable compound 7 was synthesized in the same manner as in the synthesis of polymerizable compound 3, except that 49.3 g of 1,3-propanediamine was used in place of ethylene diamine.

—Synthesis of Polymerizable Compound 8—

Polymerizable compound 8 was synthesized in the same manner as in the synthesis of polymerizable compound 3, except that 49.3 g of 1,2-propanediamine was used in place of ethylene diamine.

—Synthesis of Polymerizable Compound 11—

Polymerizable compound 11 was synthesized in the same manner as in the synthesis of polymerizable compound 2, except that 26.9 g of 1,8-diamino-3,6-dioxaoctane was used in place of 4,7,10-trioxa-1,13-tridecanediamine.

—Synthesis of Polymerizable Compound 12—

Polymerizable compound 12 was synthesized in the same manner as in the synthesis of polymerizable compound 2, except that 32.0 g of 1,10-diamino-4,7-dioxadecane was used in place of 4,7,10-trioxa-1,13-tridecanediamine.

—Synthesis of Polymerizable Compound 34—

Polymerizable compound 34 was synthesized in the same manner as in the synthesis of polymerizable compound 3, except that 45.8 g of diethylenetriamine was used in place of ethylene diamine.

—Synthesis of Polymerizable Compound 35—

Polymerizable compound 35 was synthesized in the same manner as in the synthesis of polymerizable compound 3, except that 48.7 g of triethylenetetramine was used in place of ethylene diamine.

—Synthesis of Polymerizable Compound 37—

Polymerizable compound 37 was synthesized in the same manner as in the synthesis of polymerizable compound 3, except that 58.3 g of bis(3-aminopropyl)amine was used in place of ethylene diamine.

—Synthesis of Polymerizable Compound 39—

Polymerizable compound 39 was synthesized in the same manner as in the synthesis of polymerizable compound 3, except that 58.0 g of N,N'-bis(3-aminopropyl)ethylenediamine was used in place of ethylene diamine.

Example 1

<Preparation of Ink Set 1>

A cyan ink (C-1), a magenta ink (M-1), a yellow ink (Y-1), and a black ink (K-1) of the ink formulation 1, and a treatment liquid 1 were individually prepared as follows, and an ink set 1 containing these ink compositions and the treatment liquid 1 was obtained.

[Ink Formulation 1]

(Preparation of Cyan Ink C-1)

Using the dispersion of the resin-coated cyan pigment, the resin-coated cyan pigment dispersion, a water-soluble organic solvent, ion exchanged water, an initiator, a polymerizable compound, and a surfactant were mixed in such a manner as to achieve the following ink formulation 1. Thereafter, the mixture was filtered with a 5 μm membrane filter, thereby preparing the cyan ink C-1 of the ink formulation 1.

—Ink Formulation 1—

Resin-coated cyan pigment dispersion 6%
IRGACURE 2959 (trade name, initiator) 3%
Following polymerizable compound 1 10%
OLFINE E1010 1%
(trade name, surfactant, manufactured by Nisshin Chemical Industry Co., Ltd.)
Ion exchanged water Added to be 100% in total The pH (25° C.) of the cyan pigmented ink C-1 was measured using a pH meter WM-50EG (trade name, manufactured by TOA DKK CORPORATION), and then the pH value was 8.5.

(Preparation of Magenta Ink (M-1))

The magenta ink (M-1) of the ink formulation 1 was prepared in the same manner as in the above preparation of the cyan ink (C-1), except using the resin-coated magenta pigment dispersion in place of the resin-coated cyan pigment dispersion in the preparation of the cyan ink (C-1). The pH value was 8.5.

(Preparation of Yellow Ink (Y-1))

The yellow ink (Y-1) of the ink formulation 1 was prepared in the same manner as in the above preparation of the cyan ink (C-1), except using the resin-coated yellow pigment dispersion in place of the resin-coated cyan pigment dispersion in the preparation of the cyan ink (C-1). The pH value was 8.5.

(Preparation of Black Ink (K-1))

The black ink (B-1) of the ink formulation 1 was prepared in the same manner as in the above preparation of the cyan ink (C-1), except using a pigment dispersion CAB-O-JETTM200 (trade name, carbon black dispersion, manufactured by CABOT) in place of the resin-coated cyan pigment dispersion in the preparation of the cyan ink (C-1). The pH value was 8.5.

(Preparation of Treatment Liquid 1)

The treatment liquid 1 was prepared by mixing the following materials. The pH (25° C.) of the treatment liquid 1 was 1.0 as measured with a pH meter WM-50EG (trade name) manufactured by TOA DKK CORPORATION —Treatment Liquid Composition—

Malonic acid: 25.0%
Tripropylene glycol monomethyl ether: 5.0%
(water-soluble organic solvent)
Ion exchanged water: 70.0%

Examples 2 to 7

Ink compositions C-2 to C-7, inks compositions M-2 to M-7, ink compositions Y-2 to Y-7, and ink compositions K-2 to K-7 were individually prepared in the same manner as in Example 1, except changing the kind of the polymerizable compound to each of polymerizable compounds 2 to 6 and 22 from the polymerizable compound 1 in Example 1.

Here, ink sets 2 to 7 were prepared using the ink compositions C-2 to C-7, M-2 to M-7, Y-2 to Y-7, and K-2 to K-7 and the treatment liquid 1 in the same manner as in the case where the ink set 1 was prepared using the ink compositions C-1, M-1, Y-1, K-1 and the treatment liquid 1.

Example 8

<Preparation of Ink Set 8>

A cyan ink (C-8), a magenta ink (M-8), a yellow ink (Y-8), and a black ink (K-8) of an ink formulation 8, and a treatment liquid 1 were individually prepared as follows, and then an ink set 8 containing these ink compositions and the treatment liquid 1 was obtained.

[Ink Formulation 8]

(Preparation of Cyan Ink C-8)

Using the resin-coated cyan pigment dispersion, the resin-coated cyan pigment dispersion, a water-soluble organic solvent, ion exchanged water, an initiator, a polymerizable compound, and a surfactant were mixed in such a manner as to achieve the following ink formulation 8. Thereafter, the mixture was filtered with a 5 μm membrane filter, and a cyan ink C-8 of the ink formulation 8 was prepared.

—Ink Formulation 8—

Resin-coated cyan pigment dispersion 6%
IRGACURE 2959 (trade name, initiator) 3%
Polymerizable compound 1 above 20%
OLFINE E1010 1%

(trade name, surfactant, manufactured by Nisshin Chemical Industry Co., Ltd.)

Ion exchanged water Added to be 100% in total

When the pH (25° C.) of the cyan pigmented ink C-8 was measured using a pH meter WM-50EG (trade name, manufactured by TOA DKK CORPORATION), the pH value was 8.5.

(Preparation of Magenta Ink (M-8))

The magenta ink (M-8) of the ink formulation 8 was prepared in the same manner as in the above preparation of the cyan ink (C-8), except using the resin-coated magenta pigment dispersion in place of the resin-coated cyan pigment dispersion in the preparation of the cyan ink (C-8). The pH value was 8.5.

(Preparation of Yellow Ink (Y-8))

The yellow ink (Y-8) of the ink formulation 8 was prepared in the same manner as in the above preparation of the cyan ink (C-8), except using the resin-coated yellow pigment dispersion in place of the resin-coated cyan pigment dispersion in the preparation of the cyan ink (C-8). The pH value was 8.5.

(Preparation of Black Ink (K-8))

The black ink (B-8) of the ink formulation 8 was prepared in the same manner as in the above preparation of the cyan ink (C-8), except using a pigment dispersion CAB-O-JETTM200 (trade name, carbon black dispersion, manufactured by CABOT) in place of the resin-coated cyan pigment dispersion in the preparation of the cyan ink (C-8). The pH value was 8.5.

Example 9

An ink composition C-9, an ink composition M-9, an ink composition Y-9, and an ink composition K-9 were individually prepared in the same manner as in Example 8, except using the polymerizable compound 2 in place of the polymerizable compound 1 in the Example, and then the compositions and the treatment liquid 1 are combined, thereby obtaining an ink set 9.

Examples 10 to 17

Ink compositions C-10 to C-17, inks compositions M-10 to M-17, ink compositions Y-10 to Y-17, and ink compositions K-10 to K-17 were prepared, respectively, in the same manner as in Example 1, except that polymerizable compounds 7, 8, 11, 12, 34, 35, 37 and 39 were used, respectively, in place of polymerizable compound 1.

Ink sets 10 to 17 were prepared using the ink compositions C-10 to C-17, M-10 to M-17, Y-10 to Y-17, and K-10 to K-17 and the treatment liquid 1 in the same manner as in the preparation of ink set 1 in which the ink compositions C-1, M-1, Y-1 and K-1 and the treatment liquid 1 were used.

Example 18

An ink composition C-18, an ink composition M-18, an ink composition Y-18, and an ink composition K-18 were individually prepared in the same manner as in Example 8, except using the polymerizable compound 34 in place of the polymerizable compound 1 in the Example, and then the compositions and the treatment liquid 1 were combined, thereby obtaining an ink set 18.

(Preparation of Treatment Liquid 2)

The following materials were mixed, thereby producing a treatment liquid 2. When the pH (25° C.) of the treatment liquid 2 after adjusting the pH was measured with a pH meter WM-50EG (trade name) manufactured by TOA DKK CORPORATION, the pH was 4.0.

—Treatment Liquid Composition—

Polyethyleneimine (cationic polymer): 13.0%

Ion exchanged water: 87.0%

(Preparation of Treatment Liquid 3)

The following materials were mixed, thereby producing a treatment liquid 3. When the pH (25° C.) of the treatment liquid 3 was measured with a pH meter WM-50EG (trade name) manufactured by TOA DKK CORPORATION, the pH was 4.0.

—Treatment Liquid Composition—

Magnesium nitrate (polyvalent metal salt): 15%

Diethylene glycol monoethyl ether: 4%

Surfactant A below (10% aqueous solution): 1%

Ion exchanged water: 80%

(Preparation of Treatment Liquid 4)

The following materials were mixed, thereby producing a treatment liquid 4. When the pH (25° C.) of the treatment liquid 4 after adjusting the pH was measured with a pH meter WM-50EG (trade name) manufactured by TOA DKK CORPORATION, the pH was 5.0.

—Treatment Liquid Composition—

Poly(vinylimidazole) (cationic polymer): 13.0%

GP-250 (trade name, manufactured by Sanyo Chemical Industries, Ltd., water-soluble organic solvent): 10%

Surfactant A below (10% aqueous solution): 0.2%

Ion exchanged water: 76.8%

Surfactant A: $C_7H_{15}$—CH=CH—$C_7H_{14}$—C(=O)—N($CH_3$)—$CH_2CH_2$—$SO_3Na$

Comparative Examples 1, 3

Ink sets C1 and C3 were individually prepared in the same manner as in Example 1, except using each of the comparative polymerizable compounds 1 and 2 in place of the polymerizable compound 1 in Example 1.

Comparative Examples 2, 4

Ink sets C2 and C4 were individually prepared in the same manner as in Example 8, except using each of the comparative polymerizable compounds 1 and 2 in place of the polymerizable compound 1 in Example 8.

Comparative Example 5

An ink set C5 was prepared in the same manner as in Example 1, except using the comparative polymerizable compound 3 in place of the polymerizable compound 1 in Example 1.

Comparative Example 6

An ink set C6 was prepared in the same manner as in Example 8, except using the comparative polymerizable compound 3 in place of the polymerizable compound 1 in Example 8.

Comparative Polymerizable Compound 1

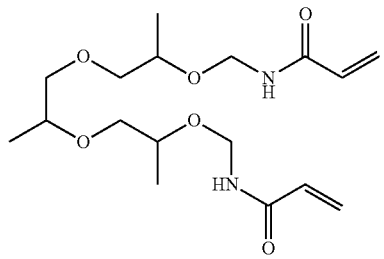

A value: 179.2

Comparative Polymerizable Compound 2

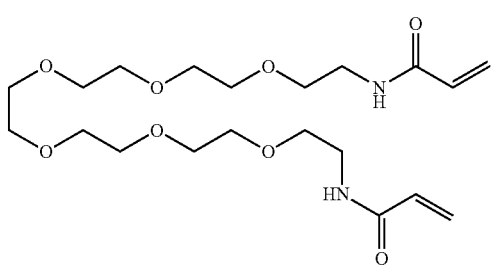

A value: 216.3

Comparative Polymerizable Compound 3

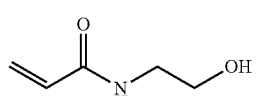

A value: 115.1

[Ink-Jet Recording]

Tokubishi Art (104.7 g/m$^2$) was prepared as a recording medium (coated paper), and an image was formed as described below. Then, the formed image was evaluated as follows.

Using the ink set 1 containing the cyan ink C-1, the magenta ink M-1, the yellow ink Y-1, and the black ink K-1 obtained above as the ink compositions, a line image and a solid image were formed with the treatment liquid 1 by 4-color single path recording.

In this case, the line image was formed by jetting a 1200 dpi line having a 1-dot width, a 1200 dpi line having a 2-dot width, and a 1200 dpi line having a 4-dot width in the main scanning direction with a single path.

The solid image was formed by jetting the ink compositions to the entire surface of the sample obtained by cutting the recording medium into A5 size. Various conditions for recording are as follows.

(1) Treatment Liquid Application Process

The treatment liquid was applied to the entire surface of the recording medium with a roll coater in which the coating amount was controlled by an anilox roller (Number of lines of 100 to 300/inch), so that the application amount was 1.4 g/m$^2$.

(2) Treatment Process

Subsequently, the recording medium to which the treatment liquid was applied was subjected to drying treatment and penetration treatment under the following conditions.

Air blowing rate: 10 m/s

Temperature: The recording medium was heated with a contact type plane heater from the surface (back surface) opposite to the recorded surface of the recording medium, so that the surface temperature on the recorded surface side of the recording medium was 60° C.

(3) Ink Application Process

Thereafter, the ink compositions were jetted to the surface of the recording medium to which the treatment liquid was applied by an ink-jet method under the following conditions, whereby a line image and a solid image were individually formed.

Head: Piezo full line heads of 1,200 dpi/20 inch width were provided for 4 colors.

Amount of jetted liquid droplets: 2.0 pL

Driving frequency: 30 kHz (4) Ink Drying Process

Subsequently, the recording medium to which the ink compositions were applied was dried under the following conditions.

Drying method: Air-blow drying

Air blowing rate: 15 m/s

Temperature: The recording medium was heated with a contact type plane heater from the surface (back surface) opposite to the recorded surface of the recording medium, so that the surface temperature on the recorded surface side of the recording medium was 60° C.

(5) Active Energy Ray Irradiation Process

Next, the recorded images were irradiated with ultraviolet rays as an active energy ray using a high-pressure mercury lamp (output 120 W/cm$^2$) so that the energy was 1000 mJ/cm$^2$, thereby obtaining evaluation samples on which images were formed.

[Evaluation]

The evaluation samples obtained above were subjected to a test for the curability of the ink and a test for the blocking resistance of the image and a test for resistance to adhesive tape as follows. The results are shown in Table 1.

[Curability]

An un-printed TOKUBISHI ART DOUBLE-SIDED N PAPER (trade name, manufactured by Mitsubishi Paper Mills, Ltd.) was wrapped around a paperweight (Weight of 470 g, Size of 15 mm×30 mm×120 mm) (Contact area of the unprinted TOKUBISHI ART and the evaluation sample of 150 mm$^2$), and then the printed surface of the evaluation sample on which the solid image was formed was rubbed back and forth with the paperweight three times (equivalent to a load of 260 kg/m$^2$). The printed surface after rubbing was visually observed, and then evaluated in accordance with the following evaluation criteria.

—Evaluation Criteria—

A Peeling of image (coloring materials) was not visually confirmed on the printed surface.

B Peeling of image (coloring materials) was slightly visually confirmed on the printed surface.

C Peeling of image (coloring materials) was visually confirmed on the printed surface, which caused problems in practical use.

[Blocking Resistance]

The evaluation sample on which the solid image was formed was cut into 2-cm-square pieces immediately after image printing, a non-recorded recording medium (the same recording medium as that used for recording (hereinafter referred to as an unused sample in this evaluation) was disposed on the image printed surface, a 350 kg/m$^2$ load was applied, and then the sample was allowed to stand under the environmental conditions of 60° C. and RH 30% for 24 hours. The unused sample was removed from the evaluation sample. Then, the ink transfer degree to the blank portion of the unused sample was visually observed, and evaluated in accordance with the following evaluation criteria.

—Evaluation Criteria—
A: No ink transfer was observed.
B: Ink transfer was not noticeable.
C: Ink transfer was observed to a certain degree, which caused problems in practical use.
D: Ink transfer was noticeable.

[Resistance to Adhesive Tape]

An adhesive tape (CELLOTAPE (trade name), manufactured by NICHIBAN CO., LTD.) was applied to the evaluation sample so that the adhesive tape adhered to the whole surface of the evaluation sample, and immediately peeled off. Color transfer to the peeled tape and the paper surface from which the tape had been peeled were observed, and the resistance to adhesive tape was evaluated in accordance with the following evaluation criteria.

—Evaluation Criteria—
A: Slight color transfer to the adhesive tape was observed, but no image peeling from the paper surface occurred.
B: Color transfer to the adhesive tape was observed, but no image peeling from the paper surface occurred.
C: Color transfer to the adhesive tape was observed, and partial image peeling from the paper surface occurred.
D: Color transfer to the adhesive tape was observed on the whole surface thereof, and image peeling from the paper surface occurred.

TABLE 1

|  | Ink set | Polymerizable compound Type | Content (%) | Curability | Blocking resistance | Resistance to adhesive tape |
|---|---|---|---|---|---|---|
| Example 1 | 1 | Polymerizable compound 1 | 10 | A | B | B |
| Example 2 | 2 | Polymerizable compound 2 | 10 | A | A | B |
| Example 3 | 3 | Polymerizable compound 3 | 10 | A | A | B |
| Example 4 | 4 | Polymerizable compound 4 | 10 | B | B | B |
| Example 5 | 5 | Polymerizable compound 5 | 10 | B | B | B |
| Example 6 | 6 | Polymerizable compound 6 | 10 | B | B | B |
| Example 7 | 7 | Polymerizable compound 22 | 10 | A | A | B |
| Example 8 | 8 | Polymerizable compound 1 | 20 | A | B | A |
| Example 9 | 9 | Polymerizable compound 2 | 20 | A | A | A |
| Example 10 | 10 | Polymerizable compound 7 | 10 | A | A | B |
| Example 11 | 11 | Polymerizable compound 8 | 10 | A | A | B |
| Example 12 | 12 | Polymerizable compound 11 | 10 | A | A | B |
| Example 13 | 13 | Polymerizable compound 12 | 10 | A | A | B |
| Example 14 | 14 | Polymerizable compound 34 | 10 | A | A | B |
| Example 15 | 15 | Polymerizable compound 35 | 10 | A | A | B |
| Example 16 | 16 | Polymerizable compound 37 | 10 | A | A | B |
| Example 17 | 17 | Polymerizable compound 39 | 10 | A | A | B |
| Example 18 | 18 | Polymerizable compound 34 | 20 | A | A | A |
| Comparative Example 1 | C1 | Comparative polymerizable compound 1 | 10 | B | C | C |
| Comparative Example 2 | C2 | Comparative polymerizable compound 1 | 20 | B | C | C |
| Comparative Example 3 | C3 | Comparative polymerizable compound 2 | 10 | C | D | C |
| Comparative Example 4 | C4 | Comparative polymerizable compound 2 | 20 | C | D | B |
| Comparative Example 5 | C5 | Comparative polymerizable compound 3 | 10 | C | D | D |
| Comparative Example 6 | C6 | Comparative polymerizable compound 3 | 20 | C | D | C |

It is found that the ink compositions of the invention are excellent in curability (curing sensitivity). It is also found that the formed images exhibit excellent blocking resistance and excellent resistance to adhesive tape.

Furthermore, the evaluations were performed in the same manner as in the above, except using treatment liquids 2 to 4 in place of the treatment liquid 1 in the evaluations above. Then, even when the treatment liquids 2 to 4 were used, images having excellent curability (curing sensitivity) and excellent blocking resistance and excellent resistance to adhesive tape were formed similarly as in the case where the treatment liquid 1 was used.

Furthermore, the evaluations were performed in the same manner as in the above, except using O.K. TOPCOAT+ (trade name, 104.7 g/m$^2$) and U-LIGHT (trade name, 104.7 g/m$^2$) as a recording medium in place of the TOKUBISHI ART (trade name, 104.7 g/m$^2$). Then, even when the O.K. TOPCOAT+ and the U-LIGHT were used, images having excellent curability (curing sensitivity) and excellent blocking resistance and excellent resistance to adhesive tape were formed similarly as in the case where the TOKUBISHI ART was used.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous ink composition comprising:
   a water-soluble polymerizable compound containing two or more polymerizable functional groups each selected from the group consisting of a (meth)acrylamide group, a maleimide group, a vinyl sulfone group, and an N-vinyl amide group, wherein a ratio of a molecular weight of the compound relative to a number of the polymerizable functional groups contained in a single molecule of the compound is 175 or less;
   a polymerization initiator; and
   water,
   wherein the polymerizable compound does not contain a partial structure represented by the following formula (IVa) or (IVb):

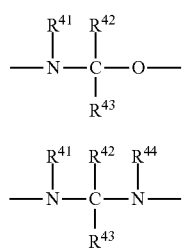
(IVa)

(IVb)

wherein $R^{41}$ to $R^{44}$ each independently represent a hydrogen atom or an alkyl group having 1 to 4 carbon atoms.

2. The aqueous ink composition according to claim 1, wherein the ratio of the molecular weight of the compound relative to the number of the polymerizable functional groups contained in a single molecule of the compound is 171 or less.

3. The aqueous ink composition according to claim 1, wherein the ratio of the molecular weight of the compound relative to the number of the polymerizable functional groups contained in a single molecule of the compound is 84 or more.

4. The aqueous ink composition according to claim 1, wherein the ratio of the molecular weight of the compound relative to the number of the polymerizable functional groups contained in a single molecule of the compound is 165 or less.

5. The aqueous ink composition according to claim 1, wherein at least one of the polymerizable functional groups is a (meth)acrylamide group.

6. The aqueous ink composition according to claim 1, wherein the polymerizable compound is a (meth)acrylamide compound represented by the following formula (V):

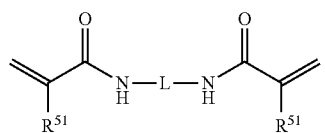
(V)

wherein $R^{51}$ represents a hydrogen atom or a methyl group; and

L represents a bivalent linking group consisting of at least one selected from the group consisting of an ethylene group, a 1,2-propylene group, a 1,3-propylene group, an oxygen atom, and a (meth)acryloylimino group.

7. The aqueous ink composition according to claim 1, wherein the polymerizable compound is a (meth)acrylamide compound represented by any one of the following formulae (I) to (III):

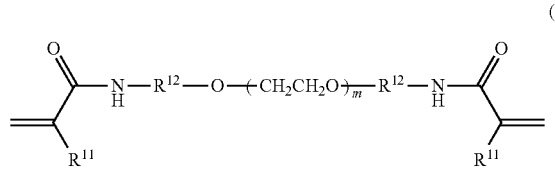
(I)

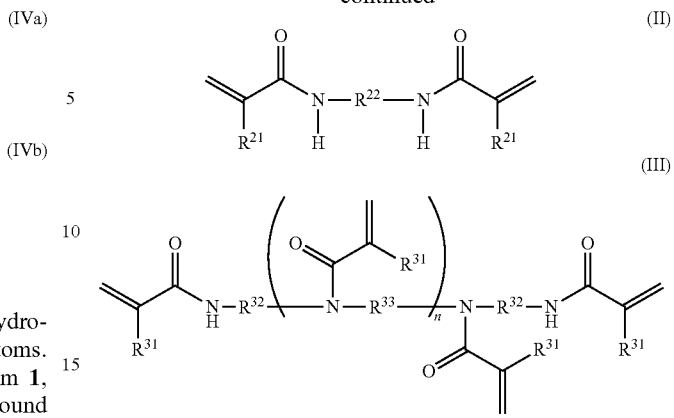
(II)

(III)

wherein $R^{11}$, $R^{21}$ and $R^{31}$ each independently represent a hydrogen atom or a methyl group; $R^{12}$ and $R^{22}$ each independently represent an ethylene group, a 1,2-propylene group or a 1,3-propylene group; $R^{32}$ and $R^{33}$ each independently represent an ethylene group or a 1,3-propylene group; and m and n each independently represent an integer of from 0 to 2.

8. The aqueous ink composition according to claim 1, further comprising a pigment.

9. The aqueous ink composition according to claim 1, wherein the polymerization initiator includes a photopolymerization initiator.

10. An ink set comprising:
the aqueous ink composition according to claim 1; and
a treatment liquid capable of forming an aggregate upon contact with the aqueous ink composition.

11. The ink set according to claim 10, wherein the treatment liquid contains at least one selected from the group consisting of an acidic compound, a polyvalent metal salt, and a cationic polymer.

12. An image forming method using the ink set according to claim 10, the method comprising:
applying the treatment liquid contained in the ink set onto a recording medium;
applying the ink composition contained in the ink set onto the recording medium to form an image; and
irradiating the ink composition applied onto the recording medium with active energy rays to fix the image.

13. The image forming method according to claim 12, wherein the aqueous ink composition is applied onto the recording medium onto which the treatment liquid has been applied.

14. An image forming method comprising:
applying the ink composition according to claim 1 onto a recording medium to form an image; and
irradiating the ink composition applied onto the recording medium with active energy rays to fix the image.

15. The image forming method according to claim 14, wherein the recording medium is a coated paper.

16. The image forming method according to claim 14, wherein the aqueous ink composition is applied by an ink-jet method.

* * * * *